US011884769B2

(12) United States Patent
Trimbos et al.

(10) Patent No.: US 11,884,769 B2
(45) Date of Patent: Jan. 30, 2024

(54) POLYURETHANE FOAM FORMING COMPOSITIONS

(71) Applicant: Soudal, Turnhout (BE)

(72) Inventors: Yvo F. H Trimbos, Turnhout (BE); Thomas Duijsters, Turnhout (BE); Ivan Boeykens, Turnhout (BE); Peter Geboes, Turnhout (BE)

(73) Assignee: Soudal, Turnhout (BE)

( * ) Notice: Subject to any disclaimer, the term of this patent is extended or adjusted under 35 U.S.C. 154(b) by 195 days.

(21) Appl. No.: 17/045,507

(22) PCT Filed: Apr. 5, 2019

(86) PCT No.: PCT/EP2019/058696
§ 371 (c)(1),
(2) Date: Oct. 6, 2020

(87) PCT Pub. No.: WO2019/193178
PCT Pub. Date: Oct. 10, 2019

(65) Prior Publication Data
US 2021/0155740 A1 May 27, 2021

(30) Foreign Application Priority Data

Apr. 6, 2018 (EP) .................... 18166182

(51) Int. Cl.
*C08G 18/08* (2006.01)
*C08G 18/18* (2006.01)
*C08G 18/20* (2006.01)
*C08G 18/24* (2006.01)
*C08G 18/32* (2006.01)
*C08G 18/38* (2006.01)
*C08G 18/48* (2006.01)
*C08G 18/76* (2006.01)
*C08J 9/00* (2006.01)
*C08J 9/14* (2006.01)
C08G 101/00 (2006.01)

(52) U.S. Cl.
CPC ......... *C08G 18/14* (2013.01); *C08G 18/1875* (2013.01); *C08G 18/2018* (2013.01); *C08G 18/2027* (2013.01); *C08G 18/246* (2013.01); *C08G 18/3206* (2013.01); *C08G 18/3218* (2013.01); *C08G 18/3821* (2013.01); *C08G 18/4829* (2013.01); *C08G 18/7671* (2013.01); *C08J 9/0061* (2013.01); *C08J 9/148* (2013.01); *C08G 2101/00* (2013.01); *C08G 2110/005* (2021.01); *C08J 2201/022* (2013.01); *C08J 2203/162* (2013.01); *C08J 2375/04* (2013.01); *C08J 2483/12* (2013.01)

(58) Field of Classification Search
CPC .. C08G 18/14; C08G 18/165; C08G 18/1816; C08G 18/1875; C08G 18/2018; C08G 18/2027; C08G 18/2081; C08G 18/246; C08G 18/3206; C08G 18/3218; C08G 18/3821; C08G 18/4018; C08G 18/4208; C08G 18/4829; C08G 18/6677; C08G 18/7664; C08G 18/7671; C08G 2101/00; C08G 2110/005; C08J 9/0023; C08J 9/0038; C08J 9/0061; C08J 9/144; C08J 9/146; C08J 9/148; C08J 2201/022; C08J 2203/162; C08J 2203/182; C08J 2205/052; C08J 2207/04; C08J 2375/04; C08J 2483/12
See application file for complete search history.

(56) References Cited

U.S. PATENT DOCUMENTS

| 9,550,854 B2 | 1/2017 | Van Der Puy et al. |
| 2012/0248371 A1* | 10/2012 | Ross ................ C08G 18/546 252/182.15 |
| 2013/0210946 A1 | 8/2013 | Ling et al. |
| 2014/0171527 A1 | 6/2014 | Yu et al. |
| 2014/0339723 A1 | 11/2014 | Taylor et al. |
| 2016/0115289 A1* | 4/2016 | Albach ................ C08J 9/122 521/130 |
| 2016/0200890 A1 | 7/2016 | Taylor et al. |

(Continued)

FOREIGN PATENT DOCUMENTS

| WO | 2009/089511 A2 | 7/2009 |
| WO | 2012170912 A2 | 12/2012 |
| WO | 2013/017554 A1 | 2/2013 |

OTHER PUBLICATIONS

Chemical base extract of 1,1,3,3,3-Pentafluoro-1-propene, ChemSpider, Royal Society of Chemistry 2020, www.chemspider.com/Chemical-Structure.62848.html.

(Continued)

Primary Examiner — John M Cooney
(74) Attorney, Agent, or Firm — N.V. Nederlandsch Octrooibureau

(57) ABSTRACT

The present invention relates to the field of polyol components suitable for forming polyurethane foam, in particular two component polyurethane foam the resulting foams and methods for their production. The present inventors found gaseous hydrohaloolefin containing polyol components possessing improved shelf-life properties, in particular polyol components comprising a gaseous hydrohaloolefin blowing agent, a nitrogen catalyst and a tin catalyst, wherein the tin catalyst comprises a sulfur atom. The present inventors also found that the shelf-life is further improved if the nitrogen catalyst is at least partially protonated by reaction with an acid, such as an organic acid.

15 Claims, No Drawings

(56) References Cited

U.S. PATENT DOCUMENTS

2018/0022885 A1  1/2018  Younes et al.
2018/0079881 A1  3/2018  Zhang et al.

OTHER PUBLICATIONS

Richard D. Chambers, "Fluorine in Organic Chemistry", @2004 Blackwell Publishing Ltd. ISBN: 978-1-405-10787-7, p. 132.
Polyurethanes Technical Conference 2016, Baltimore, Maryland, USA, Sep. 26-28, 2016, ISBN: 978-1-5108-3172-8.
Dr. Jörg Diendorf, "4th generation blowing agents: Chances and Challenges with HFOs", FEIPUR 2018.
Richard D. Chambers, "Fluorine in Organic Chemistry", @2004 Blackwell Publishing Ltd. ISBN: 978-1-405-10787-7, p. 174.

* cited by examiner

POLYURETHANE FOAM FORMING COMPOSITIONS

FIELD OF THE INVENTION

The present invention relates to the field of polyol components suitable for forming polyurethane foam, in particular two component polyurethane foam. The polyol components are in particular suitable for use in low pressure two-component polyurethane foam kits. The present invention further relates to the resulting foams and to methods for their production. In particular, the invention relates to such compositions wherein the polyol component comprises a gaseous hydrohaloolefin blowing agent, a nitrogen catalyst and a tin catalyst, wherein the tin catalyst comprises a sulfur atom.

BACKGROUND OF THE INVENTION

It is well known that low pressure two-component polyurethane foams, such as spray foams, are formed from two-component systems, the components commonly being referred to as an "A" component and a "B" component, that polymerize into a polyurethane foam when they are mixed. The "A" component comprises a diisocyanate or a polyisocyanate and optionally a blowing agent and/or further additives, and the "B" component generally comprises a gaseous blowing agent/propellant, a catalyst, a polyol and optionally further additives. The two components are packaged and stored in separate containers or stored in separate compartments within the same container. Typically, the "A" component and the "B" component are delivered through separate lines into a dispensing unit, such as an impingement mixing or static mixing type spray gun or pouring gun, generally at a ratio of around 1:1 by volume. In a system with two separate containers, the two components are kept separate throughout this entire system until they come together in the mixing section of the dispensing unit, such as a mixing nozzle or mixing chamber. When dispensed, the liquid contents come out as frothed foam which reacts and cures to form the cellular polyurethane polymer. The spray foam industry traditionally regards the isocyanate component as the "A" component and the polyol component as the "B" component. The "A" and "B" designations may be reversed in some areas.

Environmental concerns and evolving regulations have resulted in the development of hydrohaloolefin blowing agents which possess low global warming potential (GWP), such as trans-1-fluoro-3,3,3-trifluoroprop-1-ene (also known as trans-1,3,3,3-tetrafluoropropene or HFO-1234ze(E) and marketed under the name Solstice® GBA). HFO-1234ze(E) has an ozone depletion value of about zero, and an atmospheric lifetime of 14 days. Known polyol components comprising HFO-1234ze(E) suffer from one or more undesirable properties in comparison to known polyol components utilizing previous-generation blowing agents (such as chlorofluorocarbon (CFC), hydrochlorofluorocarbon (HCFC), hydrofluorocarbon (HFC)).

Such undesirable properties are usually related to a reduced shelf-life, i.e. a reduced reactivity upon aging resulting in poor-quality foams. This reduced shelf-life may be characterized by an increased foam density, increased foam thermal conductivity, increased gel time, increased tack free time, reduced foam stability, etc. upon comparison of a foam prepared using a fresh polyol component with a foam prepared using an aged polyol component (e.g. stored for several weeks, optionally at increased temperatures).

US2016/0200890 describes HFO-1234ze(E) two-component polyurethane spray foam compositions possessing improved shelf-life comprising aromatic polyester polyols and low levels of aliphatic polyether polyol in combination with an amine catalyst and an aliphatic metal salt catalyst.

U.S. Pat. No. 9,550,854 describes HFO-1234ze(E) two-component polyurethane pour-in-place foam compositions possessing improved shelf-life comprising sterically hindered amines.

WO2016/164671 describes HFO-1234ze(E) two-component polyurethane spray foam compositions comprising an unspecified tin catalyst and 2,2'-dimorfolinodi-ethylether which are described to have severe shelf-life instability and a foam density (fresh sample) of 2.2 pcf (35.24 kg/m$^3$).

It is an object of the present invention to provide gaseous hydrohaloolefin containing polyol components suitable for forming polyurethane foam and in particular suitable for use in low pressure two-component polyurethane spray foam kits possessing one or more improved shelf-life properties.

It is a further object of the present invention to provide gaseous hydrohaloolefin containing polyol components suitable for forming polyurethane foam and in particular suitable for use in low pressure two-component polyurethane spray foam kits possessing one or more improved shelf-life properties and which provide foams with a sufficiently low density and/or low thermal conductivity.

SUMMARY OF THE INVENTION

The present inventors have surprisingly found that one or more of these objectives can be met by employing a polyol component according to the present invention comprising a particular catalyst or a particular catalyst combination as disclosed herein. It has been found that the HFO containing polyol components and foams provided herein are capable of competing with the older-generation HFC containing polyol components and resulting foams with regard to shelf-life properties of the polyol blend and density and/or thermal conductivity of the resulting foams.

For the purpose of this disclosure the term "isocyanate component" refers to a combination of isocyanate such as diisocyanate or polyisocyanate or a combination thereof and optionally a blowing agent and/or further additives. The isocyanate component is often referred to as "A" component or as first component. For the purpose of this disclosure, the terms isocyanate component, "A" component and first component are used interchangeably.

For the purpose of this disclosure the term polyol component refers to a combination of a blowing agent, a catalyst, a polyol and optionally further additives. The polyol component is often referred to as "B" component or as second component. For the purpose of this disclosure, the terms polyol component, "B" component and second component are used interchangeably.

For the purpose of this disclosure the term "blowing agent" and the term "propellant" are used interchangeably.

Hence, in a first aspect the present invention provides a polyol component suitable for producing two-component polyurethane foam and in particular suitable for use in a two-component polyurethane foam-forming kit. The polyol component comprises a polyol; a gaseous hydrohaloolefin blowing agent; a nitrogen catalyst; and a tin catalyst, wherein the tin catalyst comprises a sulfur atom.

It has been found that a polyol component according to the present invention has an improved shelf-life stability. It has also been found that the resulting foams have a low density, which results in a reduced consumption of reagents for the same foam volume, rendering the polyol component according to the present invention attractive from a technical, environmental and economical perspective. It has also been found that the resulting foams have low thermal conductivity, which results in a reduced consumption of reagents for the same isolation target, rendering the polyol component according to the present invention attractive from a technical, environmental and economical perspective.

In a second aspect the present invention provides a two-component polyurethane foam-forming kit wherein the kit comprises an isocyanate component (the "A" component) comprising a suitable isocyanate and an optional blowing agent; and a polyol component (the "B" component) comprising a polyol; a gaseous hydrohaloolefin blowing agent; a nitrogen catalyst; and a tin catalyst, wherein the tin catalyst comprises a sulfur atom.

In a third aspect the present invention provides a polyurethane foam blown using a two-component polyurethane foam-forming kit wherein the kit comprises an isocyanate component comprising a suitable isocyanate and an optional blowing agent; and a polyol component comprising a polyol; a gaseous hydrohaloolefin blowing agent; a nitrogen catalyst; and a tin catalyst, wherein the tin catalyst comprises a sulfur atom.

In a fourth aspect the present invention provides a process of forming a polyurethane foam comprising:
providing an isocyanate component comprising a suitable isocyanate and optionally a blowing agent;
providing a polyol component comprising a polyol, a gaseous hydrohaloolefin blowing agent, a nitrogen catalyst and a tin catalyst, wherein the tin catalyst comprises a sulfur atom; and
mixing said isocyanate component and said polyol side component.

Hence, the present invention provides novel polyurethane foam-forming compositions, the resulting foams and methods for their production. These and other aspects of the invention will become apparent on the basis of the following detailed description and the appended examples.

It will be obvious to the person skilled in the art that during the formation of polyurethane foams, several competing reactions take place, and that by taking appropriate measures known in the art (e.g. varying the ratio of isocyanate groups to alcohol groups during the foaming process and/or employing suitable catalysts (e.g. trimerisation catalysts)), the polyol component in accordance with the invention may also be used for purposes such as polyisocyanurate formation.

DETAILED DESCRIPTION OF THE INVENTION

Reference is made to substances, components, or ingredients in existence at the time just before first contacted, formed in situ, blended, or mixed with one or more other substances, components, or ingredients in accordance with the present disclosure. A substance, component or ingredient identified as a composition, a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skills of an average chemist. The transformation of chemical reactants or starting materials to chemical products or final materials is a continually evolving process, independent of the speed at which it occurs. Accordingly, as such a transformative process is in progress there may be a mix of starting and final materials, as well as intermediate species. Unless otherwise indicated herein, definitions of (relative) amounts of components concern the composition as is.

A first aspect of the present invention concerns a polyol component suitable for producing two component polyurethane foam and in particular suitable for use in a two-component polyurethane foam-forming kit. The polyol component comprises a polyol; a gaseous hydrohaloolefin blowing agent; a nitrogen catalyst; and a tin catalyst, wherein the tin catalyst comprises a sulfur atom. The polyol component suitable for use in a two-component polyurethane foam-forming kit is also interchangeably referred to herein as the "B" component.

In preferred embodiments, the polyol component is suitable for use in a two-component polyurethane spray foam-forming kit. For the purposes of this document, suitable for use in a spray foam-forming kit should be interpreted to mean that it is possible to achieve a gel time of a foam prepared using said polyol component of less than 70 seconds, preferably less than 65 seconds, preferably less than 60 seconds.

It has been surprisingly found that the polyol component in accordance with the invention exhibits one or more desirable characteristics such as improved shelf-life, low foam density of the foam prepared with the polyol component in accordance with the invention, low thermal conductivity of the foam prepared with the polyol component in accordance with the invention. This improved shelf-life may be characterized by a small increase in foam density, a small increase in foam thermal conductivity, a small increase in gel time, a small increase in tack free time, small reduction in foam stability, etc. upon comparison of a foam prepared using a fresh polyol component with a foam prepared using an aged polyol component (e.g. stored for several weeks, optionally at increased temperatures).

In embodiments of the invention, a polyol component suitable for use in a two-component polyurethane foam-forming kit, comprising a polyol; a gaseous hydrohaloolefin blowing agent; a nitrogen catalyst; and a tin catalyst, wherein the tin catalyst comprises a sulfur atom is provided wherein the polyol component has improved shelf-life. As shown in the appended examples, and explained in the following paragraphs, several methods have been found suitable to assess the shelf-life of the polyol component in accordance with the invention.

A preferred method of assessing the shelf-life of a polyol component is by determining the catalytic decay ratio (CDR), defined as the ratio of the aged gel time to the initial gel time of a polyurethane foam sprayed using the polyol component in accordance with the invention, after 2, 7, 14, 21 or 28 days, preferably 7 days of aging at 50° C. When determining the CDR, the isocyanate component (the "A"-component) is not aged and the spraying parameters, such as component ratios, additional additives, mixing method, flow rate etc. should all be equal.

In embodiments in accordance with the invention, a polyol component suitable for use in a two-component polyurethane foam-forming kit, comprising a polyol; a gaseous hydrohaloolefin blowing agent; a nitrogen catalyst; and a tin catalyst, wherein the tin catalyst comprises a sulfur atom is provided wherein the polyol component exhibits a catalytic decay ratio determined after 7 days, preferably 28 days of aging at 50° C. of less than 2, preferably less than 1.6, preferably less than 1.5, preferably less than 1.4, preferably less than 1.3, preferably less than 1.2.

Another preferred method of assessing the shelf-life of a polyol component is by comparing the initial tack free time with the aged tack free time of a polyurethane foam sprayed using the polyol component in accordance with the invention, and determining the increase in tack free time after 2, 7, 14, 21 or 28 days, preferably 7 days of aging at 50° C., expressed as "% increase". The isocyanate component (the "A" component) is not aged and the spraying parameters, such as component ratios, additional additives, mixing method, flow rate etc. should all be equal.

In embodiments in accordance with the invention, a polyol component suitable for use in a two-component polyurethane foam-forming kit, comprising a polyol; a gaseous hydrohaloolefin blowing agent; a nitrogen catalyst; and a tin catalyst, wherein the tin catalyst comprises a sulfur atom is provided wherein the polyol component exhibits an increase in tack free time determined after 7 days, preferably 28 days of aging at 50° C. of less than 50%, preferably less than 30%, preferably less than 20%, preferably less than 15%, preferably less than 10%, preferably less than 5%.

Hence, the invention provides a polyol component suitable for use in a two-component polyurethane foam-forming kit, comprising a polyol; a gaseous hydrohaloolefin blowing agent; a nitrogen catalyst; and a tin catalyst, wherein the tin catalyst comprises a sulfur atom is provided wherein the polyol component is characterized by a CDR determined after 7 days, preferably 28 days of aging at 50° C. of less than 2, preferably less than 1.6, preferably less than 1.5, preferably less than 1.4, preferably less than 1.3, preferably less than 1.2 and/or by an increase in tack free time determined after 7 days, preferably 28 days of aging at 50° C., of less than 50%, preferably less than 30%, preferably less than 20%, preferably less than 15%, preferably less than 10%, preferably less than 5%.

Polyol

The polyol component may comprise a single polyol or several polyols, often employed and sold as a polyol pre-mix. The one or more polyols present in the polyol component may be any polyol known in the art to prepare a polyurethane foam.

As used herein "polyol" refers to a molecule that has an average of greater than 1.0 hydroxyl group per molecule. As used herein, "polyol pre-mix" refers to the total mixture of polyols present in the polyol component, irrespective of their origin (e.g. added separately to the polyol component or added as a pre-blended mixture of polyols which may have been sold as such).

Useful polyols comprise one or more of a sucrose containing polyol; phenol, a phenol formaldehyde containing polyol; a glucose containing polyol; a sorbitol containing polyol; a methylglucoside containing polyol; an aromatic polyester polyol; an aliphatic polyester polyol; an aromatic polyether polyol; an aliphatic polyether polyol; a polybutadiene polyol; a polycaprolactone polyol; a polycarbonate polyol; a hydroxyl terminated polyolefin polyol; a graft polyol; glycerol; ethylene glycol; diethylene glycol; propylene glycol-containing polyol; graft copolymers of polyether polyols with a vinyl polymer; a copolymer of a polyether polyol with a polyurea; one or more of (a) condensed with one or more of (b): (a) glycerine, ethylene glycol, diethylene glycol, trimethylolpropane, pentaerythritol, soy oil, lecithin, tall oil, palm oil, castor oil; (b) ethylene oxide, propylene oxide, a mixture of ethylene oxide and propylene oxide; or combinations thereof.

Preferred polyols comprise polyether polyols, polyester polyols, or mixtures thereof.

Examples of the polyether polyols include alkyleneoxide adducts of active hydrogen compounds such as water, alcohols, phenols, and the like. Preferred alkyleneoxides are styrene oxide, ethylene oxide, propylene oxide and/or butylene oxide. Examples of the alcohols include bivalent alcohols such as ethylene glycol and propylene glycol and polyvalent alcohols such as glycerol and sucrose; examples of the phenols include hydroquinone, bisphenol A, and the like.

Examples of the polyester polyols include condensed polyester polyols prepared by reacting a polyvalent alcohol (a bivalent or trivalent alcohol or the like described above) with a polybasic acid (succinic acid, adipic acid, sebacic acid, maleic acid, dimer acid, trimellitic acid, phtalic acid, terephthalic acid or the like), poly lactone polyols prepared by ring-opening polymerization of a lactone such as ε-caprolactone, the alkyleneoxide adducts thereof, and the like.

Highly preferred polyols comprise aliphatic polyether polyols, aliphatic polyester polyols, aromatic polyester polyols and combinations thereof. In preferred embodiments the polyol or polyol pre-mix employed in the polyol component comprises a sucrose polyol.

In embodiments the polyol or polyol pre-mix employed in the polyol component contains a majority amount of polyether and/or polyester polyol, such as more than 50 wt. % based on the total weight of polyol present in the polyol component, more than 70 wt. %, more than 85 wt. %, more than 95 wt. %, more than 98 wt. %, more than 99 wt. %.

In embodiments the polyol or polyol pre-mix employed in the polyol component contains a majority amount of aromatic polyol, such as more than 50 wt. % based on the total weight of polyol present in the polyol component, more than 70 wt. %, more than 85 wt. %, more than 95 wt. %, more than 98 wt. %, more than 99 wt. %.

In other embodiments the polyol or polyol pre-mix employed in the polyol component contains a majority amount of aliphatic polyol, such as more than 50 wt. % based on the total weight of polyol present in the polyol component, more than 70 wt. %, more than 85 wt. %, more than 95 wt. %, more than 98 wt. %, more than 99 wt. %.

In preferred embodiments, the polyol or polyol pre-mix employed in the polyol component comprises a polyol selected from the group consisting of aliphatic polyether polyols, aliphatic polyester polyols, aromatic polyester polyols and combinations thereof. In embodiments, the polyol or polyol-premix employed in the polyol component consists of aliphatic polyether polyols, aliphatic polyester polyols, aromatic polyester polyols and combinations thereof.

The polyols generally have a molecular weight range of from 200 to 6000 g/mol, more preferably from 250 to 2000 g/mol, and most preferably from 250 to 1000 g/mol.

The polyol or at least one polyol of the polyol pre-mix preferably has a hydroxyl number (OH number) ranging from 28 to 800 mg/KOH g. Hydroxyl number indicates the number of reactive hydroxyl groups available and is expressed as the number of milligrams of potassium hydroxide equivalent to the hydroxyl content of one gram of the polyol sample.

The polyol or at least one polyol of the polyol pre-mix preferably has a number average hydroxyl functionality (Fn) of 9 or less, more preferably 8 or less. Number average hydroxyl functionality refers to the average number of hydroxyl groups that are present on a molecule of the polyol and may be calculated as the ratio of the total moles of OH in the polyol or polyol pre-mix to the total moles of polyol.

It has been found that the shelf-life of the polyol formulations in accordance with the invention are further improved when the polyol is amine-free. Thus, in preferred embodiments the polyol or polyol pre-mix employed in the polyol component is free of amines. In embodiments, the polyol or polyol pre-mix employed in the polyol component contains less than 5 wt. % nitrogen, less than 2 wt. % or less than 1 wt. % based on the total weight of polyol present in the polyol component. In embodiments, the nitrogen content of the polyol or polyol pre-mix employed in the polyol component does not exceed 0.9, 0.8, 0.7, 0.6, 0.5, 0.4, 0.3, 0.2, 0.1, 0.09, 0.08, 0.07, 0.06 or 0.05 wt. % based on the weight of the polyol pre-mix, and more preferably a nitrogen content not exceeding 0.1 wt. % based on the total weight of polyol present in the polyol component. The nitrogen content of the polyol pre-mix can be determined by ASTM D 6979-14.

In embodiments, the polyol or polyol pre-mix is present in the polyol component in an amount of from 20 wt. % to 95 wt. %, preferably from 30 wt. % to 60 wt. %, and more preferably from 40 wt. % to 50 wt. %, by total weight of the polyol component.

In preferred embodiments, the polyol or polyol pre-mix comprises glycerol.

Blowing Agent

In embodiments the term 'gaseous hydrohaloolefin blowing agent' refers to a hydrohaloolefin blowing agent with a boiling point of less than 18° C. at 1 atm while the term 'liquid hydrohaloolefin blowing agent' refers to a hydrohaloolefin blowing agent with a boiling point of more than 18° C. at 1 atm.

The gaseous hydrohaloolefin blowing agent employed in the polyol component may be any gaseous hydrohaloolefin blowing agent suitable for use in the formation of a polyurethane foam and preferably has low or zero global warming potential (GWP) and ozone depletion potential (ODP). If a compound is referred to without any stereochemical designation (such as (cis), (trans), (E), (Z)), any stereoisomer of the compound is included. In embodiments of the present invention, the gaseous hydrohaloolefin blowing agent employed in the polyol component may be selected from 1,3,3,3-tetrafluoropropene (HFO 1234ze); 2,3,3,3-tetrafluoroprop-1-ene (HFO 1234yf); 1,1,3,3-tetrafluoropropene; 1,2,3,3,3-pentafluoropropene (HFO 1225ye); 3,3,3-trifluoropropene; 1,1,1,3,3-pentafluoropropene (HFO 1225zc); 1,1,2,3,3-pentafluoropropene (HFO 1225yc); (Z)-1,1,1,2,3-pentafluoropropene (HFO 1225yez); trans-1,1,1,4,4,4-hexafluoro-2-butene (HFO 1336mzz (E)) or a combination thereof.

In preferred embodiments of the present invention, the gaseous hydrohaloolefin blowing agent employed in the polyol component may be selected from 1,3,3,3-tetrafluoropropene (HFO 1234ze); 2,3,3,3-tetrafluoroprop-1-ene (HFO 1234yf); 1,1,3,3-tetrafluoropropene; 1,2,3,3,3-pentafluoropropene (HFO 1225ye); 3,3,3-trifluoropropene; 1,1,1,3,3-pentafluoropropene (HFO 1225zc); 1,1,2,3,3-pentafluoropropene (HFO 1225yc); (Z)-1,1,1,2,3-pentafluoropropene (HFO 1225yez); or a combination thereof.

In preferred embodiments, the gaseous hydrohaloolefin blowing agent employed in the polyol component comprises HFO 1234ze, preferably HFO 1234ze(E).

In preferred embodiments the gaseous hydrohaloolefin blowing agent employed in the polyol component consists of HFO 1234ze, preferably HFO 1234ze(E).

The present inventors have also found that the polyol component may optionally further comprise other blowing agents, preferably a liquid hydrohaloolefin blowing agent. The combination of a gaseous hydrohaloolefin blowing agent and a liquid hydrohaloolefin blowing agent has been found to further improve the shelf-life stability while still resulting in foams with an acceptable density. In embodiments of the present invention, the polyol component as provided herein further comprises a liquid hydrohaloolefin blowing agent selected from 1,1,1,4,4,4-Hexafluoro-2-butene (HFO-1336mzz), 1-chloro-3,3,3-trifluoropropene (HFO-1233zd) and combinations thereof, preferably HFO-1336mzz(Z), HFO-1233zd(E) and combinations thereof. It should be noted that the abbreviation "HFO" commonly used in the art when referring to liquid hydrohaloolefin blowing agents (such as HFO-1233zd) is sometimes replaced by the term "HCFO".

Thus, in preferred embodiments there is provided a polyol component suitable for producing a two-component polyurethane foam, comprising a polyol, HFO 1234ze, a nitrogen catalyst and a tin catalyst, wherein the tin catalyst comprises a sulfur atom.

In embodiments in accordance with the invention, the gaseous hydrohaloolefin blowing agent is present in the polyol component in an amount of 5-50 wt. %, preferably 10-30 wt. %, preferably 15-25 wt. % by total weight of the polyol component. In embodiments in accordance with the invention, the gaseous hydrohaloolefin blowing agent is present in the polyol component in an amount of more than 1 wt. %, preferably more than 5 wt. %, preferably more than 10 wt. %, preferably more than 15 wt. % by total weight of the polyol component. In embodiments in accordance with the invention, the gaseous hydrohaloolefin blowing agent is present in the polyol component in an amount of less than 70 wt. %, preferably less than 50 wt. %, preferably less than 40 wt. %, preferably less than 30 wt. % by total weight of the polyol component.

In embodiments in accordance with the invention, the polyol component further comprises a liquid hydrohaloolefin blowing agent in an amount of 0.1-30 wt. %, preferably of 0.5-15 wt. % by total weight of the polyol component. In embodiments in accordance with the invention, the liquid hydrohaloolefin blowing agent is present in the polyol component in an amount of more than 0.01 wt. %, preferably more than 0.05 wt. %, preferably more than 0.1 wt. %, preferably more than 1 wt. %, preferably more than 5 wt. % by total weight of the polyol component. In embodiments in accordance with the invention, the liquid hydrohaloolefin blowing agent is present in the polyol component in an amount of less than 50 wt. %, preferably less than 30 wt. %, preferably less than 20 wt. %, preferably less than 10 wt. %, preferably less than 8 wt. % by total weight of the polyol component.

In highly preferred embodiments in accordance with the invention, the polyol component comprises halogenated non-hydrohaloolefin blowing agents or propellants in an amount of less than 10 wt. %, preferably less than 5 wt. %, preferably less than 1 wt. %, preferably 0 wt. %, preferably 0 wt. % by total weight of the polyol component. Thus, in preferred embodiments in accordance with the invention there is provided a polyol component suitable for use in a two-component polyurethane foam-forming kit, comprising a polyol; a gaseous hydrohaloolefin blowing agent; a nitrogen catalyst; and a tin catalyst, wherein the tin catalyst comprises a sulfur atom, wherein the polyol component is substantially free of chlorofluorocarbon and hydrochlorofluorocarbon blowing agents. In embodiments, the polyol component is additionally free of hydrofluorocarbon blowing agents.

Nitrogen Catalyst

The nitrogen catalyst employed in the polyol component may be any amine compound, its corresponding ammonium ion or combinations thereof suitable for catalyzing the formation of a polyurethane foam.

It will be evident to any person skilled in the art that a weak base such as an amine is always in equilibrium with its conjugated acid, the ammonium ion. However, the present inventors have found that the shelf-life stability of the systems in accordance with the invention is further improved if the nitrogen catalyst is an amine compound suitable for catalyzing the formation of a polyurethane foam which is at least partially protonated by at least partially reacting the amine with an acid to generate the corresponding ammonium ion. In preferred embodiments in accordance with the invention, the nitrogen catalyst is employed in the form of an ammonium salt. In embodiments in accordance with the invention, an organic acid is used to generate the nitrogen catalyst, preferably an organic polyacid. In preferred embodiments in accordance with the invention, an organic acid is used to generate the nitrogen catalyst selected from the group consisting of aliphatic organic carboxylic acids, aliphatic organic dicarboxylic acids, aliphatic organic tricarboxylic acids and combinations thereof, preferably selected from the group consisting of oxalic acid, malonic acid, adipic acid, pimelic acid, suberic acid, azelaic acid, sebacic acid, formic acid, succinic acid, acetic acid, propionic acid, glutaric acid, and combinations thereof, more preferably succinic acid, glutaric acid, adipic acid and combinations thereof. In preferred embodiments in accordance with the invention, the nitrogen catalyst is an ammonium salt resulting from the reaction of an amine selected from the group of 2,2'-dimorfolinodiethylether or dicyclohexylmethylamine and combinations thereof with an acid selected from the group of aliphatic organic dicarboxylic acids. The ammonium ion may be generated in situ or may be generated before the nitrogen catalyst is added to the polyol component. In a preferred embodiment of the invention, the nitrogen catalyst comprises a soluble ammonium salt such as an aliphatic organic dicarboxylic acid ammonium salt, preferably succinic acid ammonium salt. In highly preferred embodiments in accordance with the invention, the nitrogen catalyst comprises an ammonium salt resulting from the reaction of an amine selected from the group of 2,2'-dimorfolinodiethylether or dicyclohexylmethylamine and combinations thereof with succinic acid. In embodiments the nitrogen catalyst comprises a quaternary ammonium compound, such as a quaternary ammonium compound of the formula $(NR^1R^2R^3R^4)^+$ wherein $R^1$, $R^2$, $R^3$ and $R^4$ are each independently selected from the group consisting of alkyls and alkenyls, preferably from the group consisting of methyl, ethyl and propyl, most preferably from the group consisting of methyl and ethyl. In highly preferred embodiments the quaternary ammonium compound is tetramethylammonium. In embodiments the quaternary ammonium compound as described herein is provided in the form of a salt with the conjugate base of an organic acid, preferably an organic polyacid. In preferred embodiments in accordance with the invention, the quaternary ammonium compound as described herein is provided in the form of a salt with the conjugate base of an organic acid selected from the group consisting of aliphatic organic carboxylic acids, aliphatic organic dicarboxylic acids, aliphatic organic tricarboxylic acids and combinations thereof, preferably selected from the group consisting of oxalic acid, malonic acid, adipic acid, pimelic acid, suberic acid, azelaic acid, sebacic acid, formic acid, succinic acid, acetic acid, propionic acid, glutaric acid, and combinations thereof, more preferably succinic acid, glutaric acid, adipic acid and combinations thereof, most preferably succinic acid. Thus, in highly preferred embodiments the nitrogen catalyst comprises tetramethylammoniumsuccinate.

In embodiments in accordance with the invention, the nitrogen catalyst has low nucleophilicity, preferably the nitrogen catalyst is sterically hindered. Suitable sterically hindered amines may include a sterically hindered primary amine, secondary amine or tertiary amine.

Useful sterically hindered tertiary amines for use as the nitrogen catalyst employed in the polyol component may include dicyclohexylmethylamine; ethyldiiso propylamine; dimethylcyclohexylamine; dimethylisopropylamine; methylisopropylbenzylamine; methylcyclopentylbenzylamine; isopropyl-sec-butyl-trifluoroethylamine; diethyl-(α-phenylethyl)amine, tri-n-propylamine; or combinations thereof. Useful sterically hindered secondary amine catalysts may include dicyclohexylamine; t-butylisopropylamine; di-t-butylamine; cyclohexyl-t-butylamine; di-sec-butylamine, dicyclopentylamine; di-(α-trifluoromethylethyl)amine; di-(α-phenylethyl) amine; or combinations thereof. Useful sterically hindered primary amine catalysts may include: triphenylmethylamine and 1,1-diethyl-n-propylamine. Other useful sterically hindered amines may include morpholines, imidazoles, ether containing compounds, and the like. These include dimorpholinodiethylether, N-ethylmorpholine, N-methylmorpholine, bis(dimethylaminoethyl)ether imidazole, n-methylimidazole, 1,2-dimethylimidazole, dimorpholinodimethylether, N,N,N',N',N'',N''-pentamethyldiethylenetriamine, N,N,N',N',N'',N''-pentaethyldiethylenetriamine, N,N,N',N',N'',N''-pentamethyldipropylenetriamine, bis(diethylaminoethyl) ether, bis(dimethylaminopropyl)ether.

In preferred embodiments of the invention, the nitrogen catalyst comprises a tertiary amine, its corresponding ammonium ion or combinations thereof, preferably the tertiary amine is selected from the group of 2,2'-dimorfolinodiethylether or dicyclohexylmethylamine.

The polyol component suitable for use in a two-component polyurethane foam-forming kit (the polyol component) may include two, three, four or more nitrogen catalysts, preferably sterically hindered amine catalysts as described above.

In embodiments in accordance with the invention, the nitrogen catalyst is present in the polyol component in an amount of 0.1-10 wt. %, preferably of 0.5-7 wt. %, more preferably 0.5-5 wt. % by total weight of the polyol component.

In preferred embodiments in accordance with the invention, the nitrogen catalyst is present in the polyol component in an amount of 0.1-10 wt. %, preferably of 0.5-7 wt. %, more preferably 1-5 wt. % by total weight of the polyol component. In embodiments in accordance with the invention, the nitrogen catalyst is present in the polyol component in an amount of more than 0.01 wt. %, preferably more than 0.05 wt. %, preferably more than 0.1 wt. %, preferably more than 0.5 wt. %, preferably more than 0.9 wt. % by total weight of the polyol component. In embodiments in accordance with the invention, the nitrogen catalyst is present in the polyol component in an amount of less than 20 wt. %, preferably less than 9 wt. %, preferably less than 8 wt. %, preferably less than 7 wt. %, preferably less than 6 wt. % by total weight of the polyol component. If the nitrogen catalyst is partially or completely added or present as an ammonium salt, the amounts are calculated taking the weight of the ammonium ion (and not the weight of the complete salt) into account.

Tin Catalyst

The present inventors have surprisingly found that when tin catalysts comprising a sulfur atom are employed in the polyol component in accordance with the invention, a polyol component with improved shelf-life characteristics is obtained. The tin catalysts comprising a sulfur atom may be any tin catalyst comprising a sulfur atom suitable for catalyzing the formation of a polyurethane foam such as tin catalysts comprising a thiol or salts and/or derivates thereof.

In embodiments in accordance with the invention, the tin catalyst comprising a sulfur atom is a tin mercaptide. In preferred embodiments the tin catalyst does not comprise carboxylate groups. In a highly preferred embodiment the tin catalyst is a tin mercaptide free of carboxylate groups.

In preferred embodiments in accordance with the invention the tin catalyst comprising a sulfur atom is selected from the group of:
dioctyltin dilaurylmercaptide,
dimethyltin bis(2-ethylhexyl thioglycolate),
dioctyltin bis(2-ethylhexyl thioglycolate),
octyltin tris(2-ethylhexyl thioglycolate),
dibutyltin bis(2-ethylhexyl thioglycolate),
dimethyltindiisooctyl thioglycolate,
methyltintriisooctyl thioglycolate,
dimethyltindilaurylmercaptide,
dibutyltindilaurylmercaptide,
and combinations thereof, preferably dibutyltindilaurylmercaptide, dimethyltindilaurylmercaptide, dioctyl dilaurylmercaptide and combinations thereof. In embodiments in accordance with the invention, the tin catalyst comprising a sulfur atom is present in the polyol component in an amount of 0.001-10 wt. %, preferably of 0.005-5 wt. %, more preferably 0.01-2 wt. % of tin by total weight of the polyol component.

In embodiments in accordance with the invention, for example to provide a polyol component for pour-in-place applications, the tin catalyst comprising a sulfur atom is present in the polyol component in an amount of 0.001-5 wt. %, preferably of 0.005-2.5 wt. %, more preferably 0.01-1 wt. % of tin by total weight of the polyol component.

In embodiments in accordance with the invention, for example to provide a polyol component for spraying applications, the tin catalyst comprising a sulfur atom is present in the polyol component in an amount of 0.001-5 wt. %, preferably of 0.005-2.5 wt. %, more preferably 0.01-1 wt. % of tin by total weight of the polyol component.

In embodiments in accordance with the invention, the tin catalyst comprising a sulfur atom is present in the polyol component in an amount of more than 0.005 wt. %, preferably more than 0.01 wt. %, preferably more than 0.05 wt. %, preferably more than 0.1 wt. %, preferably more than 0.4 wt. % of tin by total weight of the polyol component. In embodiments in accordance with the invention, the tin catalyst comprising a sulfur atom is present in the polyol component in an amount of less than 20 wt. %, preferably less than 9 wt. %, preferably less than 8 wt. %, preferably less than 7 wt. %, preferably less than 5 wt. % of tin by total weight of the polyol component.

In preferred embodiments the polyol component in accordance with the invention comprises other metal catalysts than the tin catalyst comprising a sulfur atom described herein in an amount of less than 10 wt. %, preferably less than 5 wt. %, preferably less than 1 wt. %, preferably less than 0.1 wt. %, preferably about 0 wt. %, preferably 0 wt. % by total weight of the polyol component.

In embodiments the polyol component in accordance with the invention comprises other catalysts than the nitrogen catalyst and the tin catalyst described herein in an amount of less than 10 wt. %, preferably less than 5 wt. %, preferably less than 1 wt. %, preferably less than 0.1 wt. %, preferably about 0 wt. %, preferably 0 wt. % by total weight of the polyol component. Thus, in preferred embodiments in accordance with the invention there is provided a polyol component which does not comprise other catalysts than the nitrogen catalyst and the tin catalyst. Water is not considered as a catalyst and may be present.

It is within the capabilities of the skilled person to adjust the concentration of tin catalyst and amine catalyst to provide a polyol component suitable for pour-in-place applications, or a component suitable for spray applications.

Other Additives

The polyol component in accordance with the current invention may comprise other materials such as, but not limited to, water, flame retardants, colorants, fillers, surfactants, additional catalysts, additional blowing agents, propellants, emulsifiers, solvents and/or plasticizers.

A surfactant may be added to the polyol component in order to improve characteristics such as foam formation, size control of foam cells, reducing collapse during formation etc. A foam with small bubbles or cells therein of uniform size is desired since it has the most desirable physical properties such as compressive strength and thermal conductivity.

Hence, in embodiments in accordance with the invention the polyol component may comprise a surfactant. The surfactant may be ionic or non-ionic, preferably the surfactant is non-ionic. The surfactant may be a silicone surfactant or a non-silicone surfactant, preferably the surfactant is a silicone surfactant.

In embodiments in accordance with the invention the polyol component comprises a silicone surfactant. In preferred embodiments the silicone surfactant comprises a polysiloxane polyoxyalkylene block co-polymer. In embodiments the silicone surfactant is selected from the group consisting of Momentive's L-5130, L-5180, L-5340, L-5440, L-6100, L-6900, L-6980 and L-6988; Air Products DC-193, DC-197, DC-5582, and DC-5598; and B-8404, B-8407, B-8409 and B-8462 from Goldschmidt AG of Essen, Germany. Others are disclosed in U.S. Pat. Nos. 2,834,748; 2,917,480; 2,846,458 and 4,147,847.

In embodiments in accordance with the invention, the surfactant is present in the polyol component in an amount of 0.1-10 wt. %, preferably of 0.5-7 wt. %, more preferably 1-5 wt. % by total weight of the polyol component. In embodiments in accordance with the invention, the surfactant is present in the polyol component in an amount of more than 0.01 wt. %, preferably more than 0.05 wt. %, preferably more than 0.1 wt. %, preferably more than 0.5 wt. %, preferably more than 0.9 wt. % by total weight of the polyol component. In embodiments in accordance with the invention, the surfactant is present in the polyol component in an amount of less than 10 wt. 20 wt. %, preferably less than 9 wt. %, preferably less than 8 wt. %, preferably less than 7 wt. %, preferably less than 6 wt. % by total weight of the polyol component.

Any flame retardant known in the art may be comprised in the polyol component in accordance with the invention. Examples of suitable flame retardants are tris(2-chloroethyl) phosphate, tris(2-chloropropyl)phosphate, tris(1-chloro-2-propyl) phosphate, tris(2,3-dibromopropyl)phosphate, tris (1,3-dichloropropyl) phosphate, tri(2-chloroisopropyl) phosphate, tricresyl phosphate, tri(2,2-dichloroisopropyl) phosphate, diethyl N,N-bis(2-hydroxy ethyl) aminomethylphosphonate, dimethyl methylphosphonate, tri (2,3-dibromopropyl)phosphate, tri(1,3-dichloropropyl) phosphate, and tetrakis-(2-chloroethyl) ethylene diphosphate, triethylphosphate, diammonium phosphate, various halogenated aromatic compounds, antimony oxide, aluminum trihydrate, polyvinyl chloride, melamine, tribromoneopentylalcohol, and combinations thereof preferably tribromoneopentylalcohol, tris(1-chloro-2-propyl) phosphate, triethylphosphate and combinations thereof. The flame retardant may be present in the polyol component in accordance with the current invention, for example in an amount of 1-50 wt. %, 5-40 wt. %, 15-30 wt. % by total weight of the polyol component or in an amount of more than 0.1 wt. %, more than 1 wt. %, more than 10 wt. % by total weight of the polyol component.

Any colorants known in the art may be comprised in the polyol component in accordance with the invention. Examples of suitable colorants are titanium dioxide, zinc oxide, iron oxide, antimony oxide, chrome green, chrome yellow, iron blue siennas, molybdate oranges and organic pigments such as para reds, benzidine yellow, toluidine red, toners and phthalocyanines, preferably a reactive polymer with a chromophore. The colorant may be present in the polyol component in accordance with the current invention, for example in an amount of 0.0001-10 wt. %, 0.001-5 wt. %, 0.001-1 wt. %, 0.001-0.5 wt. %, 0.001-0.1 wt. % by total weight of the polyol component or in an amount of more than 0.0001 wt. %, more than 0.001 wt. %, more than 0.01 wt. % by total weight of the polyol component. The polyol component in accordance with the current invention may be substantially free of colorants and contain the colorants in an amount of less than 0.01 wt. %, less than 0.001 wt. %, less than 0.0001 wt. %, less than 0.00001 wt. % by total weight of the polyol component.

Any fillers known in the art may be comprised in the polyol component suitable for use in a two-component polyurethane foam-forming kit in accordance with the invention. Examples of suitable fillers are aluminum silicate, calcium silicate, magnesium silicate, calcium carbonate, barium sulfate, calcium sulfate, glass fibers, carbon black and silica. The filler may be present in the polyol component suitable for use in a two-component polyurethane foam-forming kit, comprising a polyol; a gaseous hydrohaloolefin blowing agent; a nitrogen catalyst; and a tin catalyst, wherein the tin catalyst comprises a sulfur atom in accordance with the current invention, for example in an amount of 0.0001-50 wt. %, 0.001-30 wt. %, 0.01-10 wt. %, 0.01-5 wt. %, 0.01-2 wt. % by total weight of the polyol component or in an amount of more than 1 wt. %, more than 5 wt. %, more than 10 wt. % by total weight of the polyol component. The polyol component suitable for use in a two-component polyurethane foam-forming kit, comprising a polyol; a gaseous hydrohaloolefin blowing agent; a nitrogen catalyst; and a tin catalyst, wherein the tin catalyst comprises a sulfur atom in accordance with the current invention may be substantially free of filler and contain the filler in an amount of less than 0.1 wt. %, less than 0.01 wt. %, less than 0.001 wt. %, less than 0.0001 wt. % by total weight of the polyol component.

Any additional blowing agents known in the art may be comprised in the polyol component in accordance with the invention. Examples of suitable blowing agents are dimethoxymethaan, methyl formate, water, propanes, dimethyl ether, butanes, pentanes, liquid hydrohaloolefins, preferably the additional blowing agent is a liquid hydrohaloolefin blowing agent, as explained in detail earlier. It is preferred that no chlorofluorocarbon or hydrochlorofluorocarbon blowing agents are comprised in the polyol component in accordance with the invention. In embodiments it is additionally preferred that no hydrofluorocarbon blowing agents are comprised therein. The additional blowing agents may be present in the polyol component in accordance with the current invention, for example in an amount of 0.0001-25 wt. %, 0.001-20 wt. %, 0.01-10 wt. %, 0.01-5 wt. %, by total weight of the polyol component or in an amount of more than 0.1 wt. %, more than 1 wt. %, more than 2 wt. % by total weight of the polyol component. The polyol component in accordance with the current invention may be substantially free of additional blowing agents and contain additional blowing agents in an amount of less than 0.1 wt. %, less than 0.01 wt. %, less than 0.001 wt. %, less than 0.0001 wt. % by total weight of the polyol component. As explained herein earlier, it is preferred that the polyol component in accordance with the invention is free of chlorofluorocarbon or hydrochlorofluorocarbon blowing agents. In embodiments, the polyol component is additionally free of hydrofluorocarbon blowing agents.

Water may be present in the polyol component in accordance with the current invention, for example in an amount of 0.0001-15 wt. %, 0.001-10 wt. %, 0.01-7 wt. %, 0.01-5 wt. %, 0.01-2 wt. % by total weight of the polyol component or in an amount of more than 0.1 wt. %, more than 1 wt. %, more than 2 wt. % by total weight of the polyol component. The polyol component in accordance with the current invention may be substantially water-free and contain water in an amount of less than 0.1 wt. %, less than 0.01 wt. %, less than 0.001 wt. %, less than 0.0001 wt. % by total weight of the polyol component.

In preferred embodiments there is provided a polyol component suitable for use in a two-component polyurethane foam-forming kit, comprising a polyol; HFO 1234ze (E); a nitrogen catalyst; and a tin catalyst, wherein the tin catalyst comprises a sulfur atom.

In preferred embodiments there is provided a polyol component suitable for use in a two-component polyurethane foam-forming kit, comprising an aliphatic polyether polyol, an aliphatic polyester polyol, an aromatic polyester polyol and combinations thereof; a gaseous hydrohaloolefin blowing agent; a nitrogen catalyst; and a tin catalyst, wherein the tin catalyst comprises a sulfur atom.

In preferred embodiments there is provided a polyol component suitable for use in a two-component polyurethane foam-forming kit, comprising a polyol; a gaseous hydrohaloolefin blowing agent; a sterically hindered tertiary amine, its corresponding ammonium ion or combinations thereof; and a tin catalyst, wherein the tin catalyst comprises a sulfur atom.

In preferred embodiments there is provided a polyol component suitable for use in a two-component polyurethane foam-forming kit, comprising a polyol; a gaseous hydrohaloolefin blowing agent; a quaternary ammonium compound of the formula $(NR^1R^2R^3R^4)^+$ wherein $R^1$, $R^2$, $R^3$ and $R^4$ are each independently selected from the group consisting of alkyls and alkenyls, preferably from the group consisting of methyl, ethyl and propyl, most preferably from the group consisting of methyl and ethyl; and a tin catalyst, wherein the tin catalyst comprises a sulfur atom.

In preferred embodiments there is provided a polyol component suitable for use in a two-component polyurethane foam-forming kit, comprising a polyol; a gaseous hydrohaloolefin blowing agent; a nitrogen catalyst; and a tin mercaptide.

In preferred embodiments there is provided a polyol component suitable for use in a two-component polyurethane foam-forming kit, comprising an aliphatic polyether polyol, an aliphatic polyester polyol, an aromatic polyester polyol and combinations thereof; a gaseous hydrohaloolefin blowing agent; a nitrogen catalyst; and a tin mercaptide.

In preferred embodiments there is provided a polyol component suitable for use in a two-component polyurethane foam-forming kit, comprising an aromatic polyester polyol; a gaseous hydrohaloolefin blowing agent; a nitrogen catalyst; and a tin mercaptide.

In preferred embodiments there is provided a polyol component suitable for use in a two-component polyurethane foam-forming kit, comprising an aliphatic polyether polyol, an aliphatic polyester polyol, an aromatic polyester polyol and combinations thereof; HFO 1234ze(E); a nitrogen catalyst; and a tin mercaptide.

In preferred embodiments there is provided a polyol component suitable for use in a two-component polyurethane foam-forming kit, comprising an aliphatic polyether polyol, an aliphatic polyester polyol, an aromatic polyester polyol and combinations thereof; HFO 1234ze(E); a sterically hindered tertiary amine, its corresponding ammonium ion or combinations thereof; and a tin mercaptide.

In preferred embodiments there is provided a polyol component suitable for use in a two-component polyurethane foam-forming kit, comprising an aliphatic polyether polyol, an aliphatic polyester polyol, an aromatic polyester polyol and combinations thereof; HFO 1234ze(E); a quaternary ammonium compound of the formula $(NR^1R^2R^3R^4)^+$ wherein $R^1$, $R^2$, $R^3$ and $R^4$ are each independently selected from the group consisting of alkyls and alkenyls, preferably from the group consisting of methyl, ethyl and propyl, most preferably from the group consisting of methyl and ethyl; and a tin mercaptide. In preferred embodiments there is provided a polyol component suitable for use in a two-component polyurethane foam-forming kit, comprising an aliphatic polyether polyol, an aliphatic polyester polyol, an aromatic polyester polyol and combinations thereof; HFO 1234ze(E); 2,2'-dimorfolinodiethylether, dicyclohexylmethylamine or combinations thereof; and a tin mercaptide.

In preferred embodiments there is provided a polyol component suitable for use in a two-component polyurethane foam-forming kit, comprising an aliphatic polyether polyol, an aliphatic polyester polyol, an aromatic polyester polyol and combinations thereof; HFO 1234ze(E); 2,2'-dimorfolinodiethylether, dicyclohexylmethylamine, tetramethylammonium or combinations thereof; and a tin mercaptide. In preferred embodiments there is provided a polyol component suitable for use in a two-component polyurethane foam-forming kit, comprising an aliphatic polyether polyol, an aliphatic polyester polyol, an aromatic polyester polyol and combinations thereof; HFO 1234ze(E); tetramethylammonium; and a tin mercaptide.

In preferred embodiments there is provided a polyol component suitable for use in a two-component polyurethane foam-forming kit, comprising an aliphatic polyether polyol, an aliphatic polyester polyol, an aromatic polyester polyol and combinations thereof; HFO 1234ze(E); 2,2'-dimorfolinodiethylether, dicyclohexylmethylamine or combinations thereof; and dibutyltindilaurylmercaptide, dimethyltindilaurylmercaptide, dioctyl dilaurylmercaptide or combinations thereof.

In preferred embodiments there is provided a polyol component suitable for use in a two-component polyurethane foam-forming kit, comprising an aliphatic polyether polyol, an aliphatic polyester polyol, an aromatic polyester polyol and combinations thereof; HFO 1234ze(E); 2,2'-dimorfolinodiethylether, dicyclohexylmethylamine, tetramethylammonium or combinations thereof; and dibutyltindilaurylmercaptide, dimethyltindilaurylmercaptide, dioctyl dilaurylmercaptide or combinations thereof.

In preferred embodiments there is provided a polyol component suitable for use in a two-component polyurethane foam-forming kit, comprising an aliphatic polyether polyol, an aliphatic polyester polyol, an aromatic polyester polyol and combinations thereof; HFO 1234ze(E); 2,2'-dimorfolinodiethylether; and dibutyltindilaurylmercaptide, dimethyltindilaurylmercaptide, dioctyl dilaurylmercaptide or combinations thereof.

In preferred embodiments there is provided a polyol component suitable for use in a two-component polyurethane foam-forming kit, comprising an aliphatic polyether polyol, an aliphatic polyester polyol, an aromatic polyester polyol and combinations thereof; HFO 1234ze(E); dicyclohexylmethylamine; and dibutyltindilaurylmercaptide, dimethyltindilaurylmercaptide, dioctyl dilaurylmercaptide or combinations thereof.

In preferred embodiments there is provided a polyol component suitable for use in a two-component polyurethane foam-forming kit, comprising an aliphatic polyether polyol, an aliphatic polyester polyol, an aromatic polyester polyol and combinations thereof; HFO 1234ze(E); tetramethylammonium; and dibutyltindilaurylmercaptide, dimethyltindilaurylmercaptide, dioctyl dilaurylmercaptide or combinations thereof.

In preferred embodiments there is provided a polyol component suitable for use in a two-component polyurethane foam-forming kit, comprising
  20 wt. % to 95 wt. %, preferably from 30 wt. % to 60 wt. %, and more preferably from 40 wt. % to 50 wt. % polyol by total weight of the polyol component;
  5-50 wt. %, preferably 10-30 wt. %, preferably 15-25 wt. % gaseous hydrohaloolefin blowing agent by total weight of the polyol component;
  0.1-10 wt. %, preferably 0.5-7 wt. %, preferably 0.5-5 wt. % nitrogen catalyst by total weight of the polyol component; and
  dibutyltindilaurylmercaptide, dimethyltindilaurylmercaptide, dioctyl dilaurylmercaptide or combinations thereof in an amount of 0.001-10 wt. %, preferably of 0.005-5 wt. %, more preferably 0.01-2 wt. % of tin by total weight of the polyol component.

In preferred embodiments there is provided a polyol component suitable for use in a two-component polyurethane foam-forming kit, comprising
  20 wt. % to 95 wt. %, preferably from 30 wt. % to 60 wt. %, and more preferably from 40 wt. % to 50 wt. % of an aliphatic polyether polyol, an aliphatic polyester polyol, an aromatic polyester polyol and combinations thereof by total weight of the polyol component;
  5-50 wt. %, preferably 10-30 wt. %, preferably 15-25 wt. % HFO 1234ze(E) by total weight of the polyol component;
  0.1-10 wt. %, preferably 0.5-7 wt. %, preferably 1-5 wt. % 2,2'-dimorfolinodiethylether, dicyclohexylmethylamine, or combinations thereof by total weight of the polyol component; and a tin catalyst comprising a sulfur atom in an amount of 0.001-10 wt. %, preferably of 0.005-5 wt. %, more preferably 0.01-2 wt. % of tin by total weight of the polyol component.

In preferred embodiments there is provided a polyol component suitable for use in a two-component polyurethane foam-forming kit, comprising
- 20 wt. % to 95 wt. %, preferably from 30 wt. % to 60 wt. %, and more preferably from 40 wt. % to 50 wt. % of an aliphatic polyether polyol, an aliphatic polyester polyol, an aromatic polyester polyol and combinations thereof by total weight of the polyol component;
- 5-50 wt. %, preferably 10-30 wt. %, preferably 15-25 wt. % HFO 1234ze(E) by total weight of the polyol component;
- 0.1-10 wt. %, preferably 0.5-7 wt. %, preferably 0.5-5 wt. % 2,2'-dimorfolinodiethylether, dicyclohexylmethylamine, tetramethylammonium or combinations thereof by total weight of the polyol component; and
- a tin catalyst comprising a sulfur atom in an amount of 0.001-10 wt. %, preferably of 0.005-5 wt. %, more preferably 0.01-2 wt. % of tin by total weight of the polyol component.

In preferred embodiments there is provided a polyol component suitable for use in a two-component polyurethane foam-forming kit, comprising
- 20 wt. % to 95 wt. %, preferably from 30 wt. % to 60 wt. %, and more preferably from 40 wt. % to 50 wt. % of an aliphatic polyether polyol, an aliphatic polyester polyol, an aromatic polyester polyol and combinations thereof by total weight of the polyol component;
- 5-50 wt. %, preferably 10-30 wt. %, preferably 15-25 wt. % HFO 1234ze(E) by total weight of the polyol component;
- 0.1-10 wt. %, preferably 0.5-7 wt. %, preferably 1-5 wt. % 2,2'-dimorfolinodiethylether by total weight of the polyol component; and
- a tin catalyst comprising a sulfur atom in an amount of 0.001-10 wt. %, preferably of 0.005-5 wt. %, more preferably 0.01-2 wt. % of tin by total weight of the polyol component.

In preferred embodiments there is provided a polyol component suitable for use in a two-component polyurethane foam-forming kit, comprising
- 20 wt. % to 95 wt. %, preferably from 30 wt. % to 60 wt. %, and more preferably from 40 wt. % to 50 wt. % of an aliphatic polyether polyol, an aliphatic polyester polyol, an aromatic polyester polyol and combinations thereof by total weight of the polyol component;
- 5-50 wt. %, preferably 10-30 wt. %, preferably 15-25 wt. % HFO 1234ze(E) by total weight of the polyol component;
- 0.1-10 wt. %, preferably 0.5-7 wt. %, preferably 1-5 wt. % dicyclohexylmethylamine, by total weight of the polyol component; and
- a tin catalyst comprising a sulfur atom in an amount of 0.001-10 wt. %, preferably of 0.005-5 wt. %, more preferably 0.01-2 wt. % of tin by total weight of the polyol component.

In preferred embodiments there is provided a polyol component suitable for use in a two-component polyurethane foam-forming kit, comprising
- 20 wt. % to 95 wt. %, preferably from 30 wt. % to 60 wt. %, and more preferably from 40 wt. % to 50 wt. % of an aliphatic polyether polyol, an aliphatic polyester polyol, an aromatic polyester polyol and combinations thereof by total weight of the polyol component;
- 5-50 wt. %, preferably 10-30 wt. %, preferably 15-25 wt. % HFO 1234ze(E) by total weight of the polyol component;
- 0.1-10 wt. %, preferably 0.5-7 wt. %, preferably 0.5-5 wt. % tetramethylammonium by total weight of the polyol component; and
- a tin catalyst comprising a sulfur atom in an amount of 0.001-10 wt. %, preferably of 0.005-5 wt. %, more preferably 0.01-2 wt. % of tin by total weight of the polyol component.

A second aspect of the invention concerns a two-component polyurethane foam-forming kit wherein the kit comprises an isocyanate component ("A" component or first component) comprising a suitable isocyanate and an optional blowing agent; and a polyol component ("B" component or second component) comprising a polyol; a gaseous hydrohaloolefin blowing agent; a nitrogen catalyst; and a tin catalyst, wherein the tin catalyst comprises a sulfur atom. The second component is the polyol component suitable for producing two component polyurethane foam as described above. In preferred embodiments the kit is a two-component polyurethane spray foam-forming kit.

It has been found that the polyol component in accordance with the invention, described herein earlier, can advantageously be combined with a variety of isocyanate components in order to provide a kit which can conveniently be used to produce polyurethane foams. The kit may be presented in the form of separate canisters or containers, for example a polyisocyanate container comprising the polyisocyanate component and a polyol container comprising the polyol component. The two components may also be presented in the form of a single container wherein the two components are included in different internal compartments. The containers or canisters are typically pressurized cylinders or cans equipped with dispensing valves, as is known in the art. This type of presentation of two-component polyurethane spray-foam forming kits is known in the art in many variations. In embodiments in accordance with the invention, the pressurized cylinders or cans are partially pressurized by means of nitrogen gas to facilitate dispensing all product contained in the canister. Preferably, the canister employs a pressure of at least 5 bar, at least 7 bar, at least 15 bar.

The kit may comprise a dispensing means such as a spray gun for dispensing the two components. The dispensing means may optionally be equipped with a mixer, e.g. an impingement or static mixer.

The two-component polyurethane foam-forming kit in accordance with the present invention may comprise the isocyanate component and the polyol component in amounts which correspond to commonly employed stoichiometric ratios for foam formation. Thus, in embodiments a two-component polyurethane foam-forming kit in accordance with the present invention is provided wherein the kit comprises relative amounts of suitable isocyanate and polyol such that the NCO/OH stoichiometric ratio is in a range of from 0.9 to 5.0, preferably from 1.0 to 3.0, more preferably from 1.1 to 2.5.

The suitable isocyanate comprised in the polyisocyanate component may be any polyisocyanate or combinations thereof suitable for use in the formation of a polyurethane foam. As used herein the term "polyisocyanate" represents any compound with 2 or more isocyanate groups. Any organic polyisocyanate can be employed in polyurethane foam synthesis inclusive of aliphatic and aromatic polyisocyanates. Suitable organic polyisocyanates include aliphatic, cycloaliphatic, araliphatic, aromatic, and heterocyclic isocyanates which are well known in the field of polyurethane chemistry. In embodiments in accordance with the invention, the suitable isocyanate comprised in the "A"-component is an organic polyisocyanate, for example a compound selected from the group formed by the aromatic diisocyanates (such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like); the aromatic triisocyanates (such as 4,4',4"-triphenylmethane triisocyanate, 2,4,6-toluene triisocyanates); the aromatic tetraisocyanates (such as 4,4'-dimethyldiphenylmethane-2,2',5,5'-tetraisocyanate); arylalkyl polyisocyanates (such as xylylene diisocyanate); aliphatic polyisocyanates (such as hexamethylene-1,6-diisocyanate, lysine diisocyanate methylester); polymethylene polyphenylisocyanates; hydrogenated methylene diphenylisocyanate; m-phenylene diisocyanate; naphthylene-1,5-diisocyanate; 1-methoxyphenylene-2,4-diisocyanate; 4,4'-biphenylene diisocyanate; 3,3'-dimethoxy-4,4'-biphenyl diisocyanate; 3,3'-dimethyl-4,4'-biphenyl diisocyanate; 3,3'-dimethyldiphenylmethane-4,4'-diisocyanate; alkylene diisocyanates (such as trimethylene diisocyanate, tetramethylene diisocyanate, and hexamethylene diisocyanate, isophorene diisocyanate, 4,4'-methylenebis(cyclohexyl isocyanate)); aromatic polyisocyanates (such as m-, and p-phenylene disocyanate, polymethylene polyphenyl isocyanate, 2,4- and 2,6-toluenediisocyanate, dianisidine diisocyanate, bitoylene isocyanate, naphthylene 1,4-diisocyanate, bis(4-isocyanatophenyl), methene, bis(2-methyl-4-isocyanatophenyl)methane); and combinations thereof. In preferred embodiments in accordance with the invention, the suitable isocyanate comprised in the isocyanate component is an aromatic polyisocyanate, such as polymeric methyldiphenyldiisocyanate.

The isocyanate component of the two-component polyurethane foam-forming kit in accordance with the present invention may be provided without a blowing agent. Alternatively, the isocyanate component of the two-component polyurethane foam-forming kit in accordance with the present invention may be provided with a blowing agent. In preferred embodiments, the isocyanate component of the two-component polyurethane foam-forming kit in accordance with the present invention is provided with a blowing agent. The optional blowing agent comprised in the isocyanate component may be any blowing agent suitable for use in the formation of a polyurethane foam. In preferred embodiments the optional blowing agent comprised in the isocyanate component is HFO 1234ze, preferably HFO 1234ze(E).

In highly preferred embodiments in accordance with the invention, the isocyanate component comprises halogenated non-hydrohaloolefin blowing agents or propellants in an amount of less than 10 wt. %, preferably less than 5 wt. %, preferably less than 1 wt. %, preferably about 0 wt. %, preferably 0 wt. % by total weight of the isocyanate component.

In preferred embodiments in accordance with the invention there is provided a two-component polyurethane foam-forming kit wherein the kit comprises a first component comprising a suitable isocyanate and an optional blowing agent; and a second component comprising a polyol; a gaseous hydrohaloolefin blowing agent; a nitrogen catalyst; and a tin catalyst, wherein the tin catalyst comprises a sulfur atom, wherein the isocyanate and the polyol component are substantially free of chlorofluorocarbon and hydrochlorofluorocarbon blowing agents. In embodiments the kit is also free of hydrofluorocarbon blowing agents.

It will be understood by the person skilled in the art that when the polyol component provided by the present invention is comprised in a two-component polyurethane foam-forming kit, as set out herein earlier, the shelf-life characteristics may also be assessed on the kit as a whole.

The invention thus provides a two-component polyurethane foam-forming kit as described herein earlier, which has improved shelf-life. The shelf-life may be assessed in accordance with the methods described herein earlier for the polyol component, with the difference that the isocyanate component is also aged. This may, for example, be practical for embodiments of the kit in accordance with the invention wherein the polyol component and the isocyanate component are packaged in a single container with an internal wall for separating the isocyanate component and polyol component.

A preferred method of assessing the shelf-life of a two-component polyurethane foam-forming kit is by determining the catalytic decay ratio (CDR), defined as the ratio of the aged gel time to the initial gel time of a polyurethane foam sprayed using the kit, after 4 weeks, preferably 8 weeks of aging at 23° C. When determining the CDR, the isocyanate component (the "A"-component) is also aged and the spraying parameters, such as component ratios, additional additives, mixing method, flow rate etc. should all be equal.

In embodiments in accordance with the invention, a two-component polyurethane foam-forming kit as described herein earlier is provided wherein the kit exhibits a catalytic decay ratio determined after 8 weeks of aging at 23° C. of less than 2, preferably less than 1.6, preferably less than 1.5, preferably less than 1.4, preferably less than 1.3, preferably less than 1.2.

Another preferred method of assessing the shelf-life of a two-component polyurethane foam-forming kit as described herein earlier is by comparing the initial tack free time with the aged tack free time and determining the increase in tack free time after 4 weeks, preferably 8 weeks of aging at 23° C., expressed as "% increase". The isocyanate component (the "A"-component) is also aged and the spraying parameters, such as component ratios, additional additives, mixing method, flow rate etc. should all be equal.

In embodiments in accordance with the invention, a two-component polyurethane foam-forming kit as described herein earlier is provided wherein the kit exhibits an increase in tack free time determined after 8 weeks of aging at 23° C. of less than 50%, preferably less than 30%, preferably less than 20%, preferably less than 15%, preferably less than 10%, preferably less than 5%.

Hence, the invention provides a two-component polyurethane foam-forming kit as described herein earlier wherein the kit is characterized by a CDR determined after 8 weeks of aging at 23° C., optionally under pressure as described earlier of less than 2, preferably less than 1.6, preferably less than 1.5, preferably less than 1.4, preferably less than 1.3, preferably less than 1.2 and/or by an increase in tack free time determined after 8 weeks of aging at 23° C. of less than 50%, preferably less than 30%, preferably less than 20%, preferably less than 15%, preferably less than 10%, preferably less than 5%.

In a third aspect the present invention provides a foam, preferably a polyurethane foam blown using a polyol component wherein the polyol component comprises a polyol; a gaseous hydrohaloolefin blowing agent; a nitrogen catalyst; and a tin catalyst, wherein the tin catalyst comprises a sulfur atom. The polyol component has been described in various embodiments above. In preferred embodiments, the foam is a spray-foam.

It has been found that the polyol component in accordance with the invention, described herein earlier, can advantageously be used to produce a foam, preferably a polyurethane foam. The foam, preferably polyurethane foam in accordance with the invention may be rigid, flexible or semi-rigid. The foam, preferably polyurethane foam in accordance with the invention may have a closed cell structure, an open cell structure or a mixture of open and closed cells. These foams are used in a variety of well-known applications, including but not limited to thermal insulation, cushioning, flotation, packaging, adhesives, void filling, crafts and decorative and shock absorption. In highly preferred embodiments, the foam is a closed-cell foam.

The use of a polyol component in accordance with the invention has been found to provide a foam, preferably a polyurethane foam with excellent thermal insulation characteristics. Thus, in embodiments in accordance with the present invention, there is provided a foam, preferably a polyurethane foam blown using a polyol component in accordance with the invention, wherein the foam has a thermal conductivity of less than 25 mW/m·K, less than 24 mW/m·K, less than 23 mW/m·K, less than 22 mW/m·K, less than 21.5 mW/m·K, less than 21 mW/m·K, measured at a mean reference temperature of 10° C. A preferred method of measuring the thermal insulation is according to EN 12667.

The use of a polyol component in accordance with the invention has been found to provide a foam, preferably a polyurethane foam with desirable density characteristics. Thus, in embodiments in accordance with the present invention, there is provided a closed-cell foam, preferably a polyurethane foam blown using a polyol component in accordance with the invention, wherein the foam has a free-rise core density of less than 35 kg/m$^3$, less than 34 kg/m$^3$, less than 32 kg/m$^3$, less than 31 kg/m$^3$, less than 30 kg/m$^3$, less than 29 kg/m$^3$, less than 28 kg/m$^3$. A preferred method of measuring the density is according to EN 1602.

In preferred embodiments, the present invention provides a closed-cell foam, preferably a polyurethane foam comprising a gaseous hydrohaloolefin in the cells of the foam wherein the foam, preferably polyurethane foam has a density of less than 35 kg/m$^3$. The polyurethane foam comprising a gaseous hydrohaloolefin in the cells of the foam may have a density of less than 35 kg/m$^3$, less than 34 kg/m$^3$, less than 33 kg/m$^3$, less than 32 kg/m$^3$, less than 31 kg/m$^3$, less than 30 kg/m$^3$, less than 29 kg/m$^3$.

In embodiments in accordance with the present invention, there is provided a closed-cell foam, preferably a polyurethane foam blown using a polyol component in accordance with the invention, wherein the foam has a maximal compressive strength of more than 100 kPa, more than 130 kPa, more than 140 kPa or more than 145 kPa as determined in accordance with EN 826 (2013).

In embodiments of the present invention, the gaseous hydrohaloolefin blowing agent in the cells of the foam, preferably polyurethane foam may be selected from 1,3,3,3-tetrafluoropropene (HFO 1234ze); 2,3,3,3-tetrafluoro-prop-1-ene (HFO 1234yf); 1,1,3,3-tetrafluoropropene; 1,2,3,3,3-pentafluoropropene (HFO 1225ye); 3,3,3-trifluoropropene; 1,1,1,3,3-pentafluoropropene (HFO 1225zc); 1,1,2,3,3-pentafluoropropene (HFO 1225yc); (Z)-1,1,1,2,3-pentafluoropropene (HFO 1225yez); or a combination thereof.

In preferred embodiments, the gaseous hydrohaloolefin blowing agent in the cells of the foam, preferably polyurethane foam comprises HFO 1234ze, preferably HFO 1234ze (E).

In preferred embodiments the gaseous hydrohaloolefin blowing agent in the cells of the foam, preferably polyurethane foam consists of HFO 1234ze, preferably HFO 1234ze (E).

In embodiments in accordance with the invention, the cells of the foam comprise halogenated non-hydrohaloolefin blowing agents or propellants in an amount of less than 10 wt. %, preferably less than 5 wt. %, preferably less than 1 wt. %, preferably about 0 wt. %, preferably 0 wt. % by total weight of the foam. In embodiments in accordance with the invention, the composition of the gas enclosed in a closed cell of the foam, comprises non-hydrohaloolefin blowing agents or propellants in an amount of less than 10 mol %, preferably less than 5 mol %, preferably less than 1 mol %, preferably about 0 mol %, preferably 0 mol %. In preferred embodiments in accordance with the invention there is provided a foam, preferably a polyurethane foam comprising a gaseous hydrohaloolefin in the cells of the foam wherein the foam, preferably polyurethane foam is substantially free of chlorofluorocarbon and hydrochlorofluorocarbon blowing agents. In embodiments the foam is also free of hydrofluorocarbon blowing agents.

A preferred method of determining that the gas enclosed in a closed cell of the foam is free of non-hydrohaloolefin blowing agents is by trace analysis of the gas released from the foam, preferably by gas chromatography, preferably coupled to mass spectroscopy. A suitable method is the method described in Vollrath, A., Hohl, C. & Seiler, H. G. Fresenius J Anal Chem (1995) 351: 251. This method may be applied to determine that the foam is free of CFC and HCFC blowing agents and may be adapted, as is within the capabilities of the person skilled in the art, to determine that the foam is additionally free of HFC blowing agents. Alternatively, another suitable method is described in A. Reizian, S. Rault, Y. Dat, M. Robba, A mass spectrometric method for the detection of various fluorocarbon derivatives in synthetic flexible and rigid foams, Chemosphere, Volume 27, Issue 9, 1993, Pages 1681-1690. The composition is preferably determined using a fresh foam sample. In preferred embodiments in accordance with the invention there is provided a polyurethane foam comprising a gaseous hydrohaloolefin in the cells of the foam wherein the foam, preferably polyurethane foam is substantially free of chlorofluorocarbon, hydrochlorofluorocarbon or hydrofluorocarbon blowing agents.

In a fourth aspect the present invention provides a process of forming a foam, preferably a polyurethane foam comprising:
  providing an isocyanate component comprising a suitable isocyanate and an optional blowing agent;
  providing a polyol component comprising a polyol, a gaseous hydrohaloolefin blowing agent, a nitrogen catalyst and a tin catalyst, wherein the tin catalyst comprises a sulfur atom; and
  mixing said isocyanate component and said polyol component.

In embodiments in accordance with the invention, the process comprises mixing the "A"-side component and the "B"-side component in relative amounts resulting in a NCO/OH stoichiometric ratio is in a range of from 0.9 to 5.0, preferably from 1.0 to 3.0, more preferably from 1.1 to 2.5. The mixing may comprise any kind of mixing known in the art. Preferred methods to mix the "A"-side component and the "B"-side component comprise impingement mixing or static mixing.

In preferred embodiments, there is provided a process of forming a foam, preferably a polyurethane spray foam comprising providing an isocyanate component comprising a suitable isocyanate and an optional blowing agent;

providing a polyol component comprising a polyol, a gaseous hydrohaloolefin blowing agent, a nitrogen catalyst and a tin catalyst, wherein the tin catalyst comprises a sulfur atom; and mixing said isocyanate component and said polyol side component to obtain a mixture of the isocyanate component and the polyol component, spraying the mixture of the isocyanate component and the polyol component obtained in the previous step.

Thus, the invention has been described by reference to certain embodiments discussed above. It will be recognized that these embodiments are susceptible to various modifications and alternative forms well known to those of skill in the art. Many modifications in addition to those described above may be made to the structures and techniques described herein without departing from the spirit and scope of the invention. Accordingly, although specific embodiments have been described, these are examples only and are not limiting upon the scope of the invention. Furthermore, for a proper understanding of this document and in its claims, it is to be understood that the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one". The following examples are offered for illustrative purposes only, and are not intended to limit the scope of the present invention in any way.

EXAMPLES

List of abbreviations/compounds referred to in the examples:

| Abbreviations/compounds | Other Names | Supplier | Role |
| --- | --- | --- | --- |
| PA240 | Isoexter ® 4354, Aromatic PA based polyester polyol | COIM | Polyol |
| TCPP | Tris (1-chloro-2-propyl) phosphate | ICL-IP | Plasticizer, fire retardant |
| DC193 | DIMETHYLSILOXANE, ETHYLENE OXIDE BLOCK COPOLYMER | Evonik | Surfactant/foam stabilizer |
| Z425 | PZ400-4G, sucrose/glycerol propoxylated polyol, Alcupol ® R-4110 | Ottchim | Polyol |
| TEP | triethylphosphate | ICL-IP | Plasticizer |
| DMTDLM | dimethyltindilaurylmercaptide, Fomrez ® UL-22 | Galat Chemicals | Metal catalyst |
| glycerine | glycerol | Brenntag | polyol |
| Struksilon ® 8026 | polyether modified polydimethyl siloxane | Schill & Seilacher | Surfactant/structuring agent |
| Koc | Hexanoicacid, 2-ethyl-, potassium salt (Koc), 74 wt. % in diethylene glycol | Brenntag | Catalyst/trimerization agent |
| polycat ® 203 | | Evonik | Nitrogen catalyst |
| dabco ® 2040 | 1,2-Dimethylimidazole, 70 wt. % in ethylene glycol, Toyocat DM70 (70%) | Evonik | Nitrogen catalyst |
| dabco ® T120 | di-n-butylbis(dodecylthio)tin, dibutyltindilaurylmercaptide, | Evonik | Metal catalyst |
| Fomrez ® UL-54 | Dimethyltin bis(2-ethylhexyl thioglycolate) + methyltintriisooctyl thioglycolate | Galata Chemicals | Metal catalyst |
| solstice ® LBA | trans-1-chloro-3,3,3-trifluoropropene | Honeywell | Liquid blowing agent |
| Solstice ® GBA | trans-1,3,3,3-tetrafluoropropene | Honeywell | Gaseous blowing agent |
| DMDEE | 2,2'-dimorpholinodiethylether | Huntsman | Nitrogen catalyst |
| Dabco ® LK221E | non silicone surfactant | Evonik | Structuring agent/foam stabiliser |
| Ethacure ® 100-LC | Diethyltoluenediamine | Albemarle | Chain extender/catalyst |
| Polycat ® 12 | dicyclohexylmethylamine | Evonik | Nitrogen catalyst |
| TBNPA | Tribromoneopentylalcohol | ICL-IP | Flame retardant |
| Reactint Orange ® X96 | | Milliken Chemicals | Colorant |
| Suprasec ® 5025 | polymeric MethylDiphenylDiisocyanate | Huntsman | polyisocyanate/Crosslinker |
| Dabco TMR 7 | 50% solution of tetramethylammonium 2,2-dimethylpropanoate in 1,2-ethanediol | Evonik | Nitrogen catalyst/trimerization agent |

Examples 1-23

In order to determine the shelf-life profile of different polyol components, fresh and aged samples of various polyol components were prepared according to the protocol described below and one or more of the following reactions parameters were determined:

Gel Time (GT): Period from the start of mixing the isocyanate and polyol components to the time when, if a wooden chopstick is inserted to a depth of 1 cm into the reaction mixture and pulled out, the reaction mixture deposited on the chopstick appears stringy/solidified or the chopstick encounters a solid core. Frequency of insertion is about 1 time per second.

Tack-Free Time (TFT): Period from the start of mixing the isocyanate and polyol components to the time when, if a protected finger is brought into contact with the surface of the reaction mixture, the resin appears non-adhesive to the protected finger. Frequency of insertion is about 1 time per second.

Sample Preparation Protocol:

Polyol component: The polyol component was prepared by adding the different ingredients (shown in the following tables) into a glass bottle which is sealed to prevent product loss. If a liquid blowing agent is present in the polyol component, this ingredient is added last. The gaseous blowing agent (solstice GBA) is not added. The resulting mixture is homogenized by vigorous manual shaking and allowed to settle for approx. 4 h at room temperature (RT).

Fresh samples: 30.0 g of polyol component is transferred into a disposable 250 cc coated paper ice cream cup and an amount of suprasec 5025 (a polymeric MethylDiphenylDiisocyanate) was added so that the reaction mixture has the ISO index shown in the below tables. The ISO index is defined as NCO/(OH+NH) multiplied by 100, i.e. the ratio of the number of isocyanate groups in the reaction mixture to the number of alcohol and amine groups in the reaction mixture, multiplied by 100. The ISO index of the examples was calculated as the ISO index which would be obtained when the complete polyol component (including Solstice GBA) would be mixed at a 1:1 volume ratio with an isocyanate component consisting of 90 wt. % suprasec 5025 and 10 wt. % Solstice GBA unless mentioned otherwise. The contents of the cup are mixed with a hand-held mixer (Huvema HU 13 Laserdrill with attached 60 mm diameter propeller paint mixer) at 2500-3000 rpm during 5 seconds at room temperature (23° C.±2° C.), no heating or cooling is applied. After 5±1 seconds mixing is stopped, the mixer is removed from the cup and one or more reaction parameters described above are determined.

Aged samples: 40 g of the fresh the polyol component prepared as described above (i.e. without gaseous blowing agent) is transferred into a tin aerosol can. This can is sealed with an aerosol valve and subsequently the gaseous blowing agent (Solstice GBA) is added through the valve. This sample is shaken vigorously and is aged in an oven at 50° C. After ageing the sample is subjected to vigorous manual shaking and degassed (removal of Solstice GBA) and allowed to cool and stabilize for approximately 4 h at room temperature. After the degassing/stabilization period, the can is punctured and 30.0 g of the aged liquid is poured into a disposable cup. Next, an amount of suprasec 5025 (a polymeric MethylDiphenylDiisocyanate) is added corresponding to the ISO index shown in the below tables. The ISO index is defined as NCO/(OH+NH) multiplied by 100, i.e. the ratio of the number of isocyanate groups in the reaction mixture to the number of alcohol and amine groups in the reaction mixture, multiplied by 100. The ISO index of the examples was calculated based on the ISO index which would be obtained when the complete polyol component (including Solstice GBA) would be mixed at a 1:1 volume ratio with an isocyanate component consisting of 90 wt. % suprasec 5025 and 10 wt. % Solstice GBA. The contents of the cup are mixed with a hand-held mixer (Huvema HU 13 Laserdrill with attached 60 mm diameter propeller paint mixer) at 2500-3000 rpm during 5 seconds at room temperature (i.e. no heating or cooling is applied). After 5 seconds mixing is stopped, the mixer is removed from the cup and one or more reaction parameters described above are determined.

| COMPOSITION | Comparative Example 1 | | Comparative Example 2 | |
|---|---|---|---|---|
| | parts by wt. | wt. % | parts by wt. | wt. % |
| Polyol component | | | | |
| Z425 | 62.5 | 28.1 | 62.5 | 28.1 |
| PA240 | 37.5 | 16.9 | 37.5 | 16.9 |
| Struksilon 8026 | 6.25 | 2.81 | 6.25 | 2.81 |
| water | 2.5 | 1.13 | 2.5 | 1.13 |
| TCPP | 45 | 20.3 | 45 | 20.3 |
| TEP | 3.75 | 1.69 | 3.75 | 1.69 |
| Koc | 3 | 1.35 | 3 | 1.35 |
| Dabco 2040 | 1.62 | 0.73 | 0 | 0 |
| Polycat 203 | 0 | 0 | 1.62 | 0.73 |
| Solstice GBA | 60 | 27 | 60 | 27 |
| Total | 222.12 | 100.00 | 222.12 | 100.00 |
| ISO Index[a] | 165 | | 166 | |
| Fresh sample | | | | |
| Gel time (sec) | 38 | | 44 | |
| Tack free time (sec) | 46 | | 60 | |
| Aged-4 days 50° C. | | | | |
| Gel time (sec) | N.A. - foam collapse | | N.A. - foam collapse | |
| Tack free time (sec) | N.A. - foam collapse | | N.A. - foam collapse | |
| CDR | — | | — | |
| TFT increase (%) | — | | — | |

[a]calculated as the ISO index which would be obtained when the complete polyol component (including Solstice GBA) would be mixed at a 1:1 volume ratio with an isocyanate component consisting of 93.81 wt. % suprasec 5025 and 6.19 wt. % Solstice GBA.

| COMPOSITION | Comparative example 3 | | Comparative example 4 | | Comparative example 5 | |
|---|---|---|---|---|---|---|
| | parts by wt. | wt. % | parts by wt. | wt. % | parts by wt. | wt. % |
| Polyol component | | | | | | |
| Z425 | 62.5 | 28.04 | 62.5 | 27.96 | 62.5 | 27.78 |
| PA240 | 37.5 | 16.82 | 37.5 | 16.78 | 37.5 | 16.67 |
| Struksilon 8026 | 6.25 | 2.80 | 0 | 0.00 | 0 | 0.00 |
| water | 2.5 | 1.12 | 2.5 | 1.12 | 2.5 | 1.11 |
| TCPP | 41.4 | 18.57 | 45 | 20.13 | 45 | 20.00 |
| TEP | 3.75 | 1.68 | 3.75 | 1.68 | 3.75 | 1.67 |
| Koc | 3 | 1.35 | 3 | 1.34 | 3 | 1.33 |
| Bismuth catalyst | 4 | 1.79 | 0 | 0.00 | 0 | 0.00 |
| DMDEE | 2 | 0.90 | 0 | 0.00 | 2 | 0.89 |

| COMPOSITION | Comparative example 3 parts by wt. | wt. % | Comparative example 4 parts by wt. | wt. % | Comparative example 5 parts by wt. | wt. % |
|---|---|---|---|---|---|---|
| Dabco LK221E | 0 | 0.00 | 6.25 | 2.80 | 6.25 | 2.78 |
| Dabco 2040 | 0 | 0.00 | 3 | 1.34 | 2.5 | 1.11 |
| Solstice GBA | 60 | 26.92 | 60 | 26.85 | 60 | 26.67 |
| Total | 222.9 | 100.00 | 223.5 | 100.00 | 225 | 100.00 |
| ISO Index[a] | 171 | | 166 | | 169 | |
| Fresh sample | | | | | | |
| Gel time (sec) | 30 | | 33 | | 32 | |
| Tack free time (sec) | 42 | | 44 | | 42 | |
| Aged-7 days 50° C.[b] | | | | | | |
| Gel time (sec) | N.A.-foam collapse | | 35 | | 38 | |
| Tack free time (sec) | N.A.-foam collapse | | 60 | | 60 | |
| CDR | | | 1.06 | | 1.19 | |
| TFT increase (%) | | | 36% | | 43% | |

[a] calculated as the ISO index which would be obtained when the complete polyol component (including Solstice GBA) would be mixed at a 1:1 volume ratio with an isocyanate component consisting of 93.81 wt. % suprasec 5025 and 6.19 wt. % Solstice GBA.
[b] all samples contained precipitation after 7 days at 50° C. indicating degradation of reagents.

| COMPOSITION | Comparative Example 6 parts by wt. | wt. % | Comparative Example 7 parts by wt. | wt. % |
|---|---|---|---|---|
| Polyol component | | | | |
| Z425 | 62.5 | 27.45 | 62.5 | 26.29 |
| PA240 | 37.5 | 16.47 | 37.5 | 15.78 |
| Struksilon 8026 | 6.25 | 2.75 | 6.25 | 2.63 |
| water | 2.65 | 1.16 | 2.7 | 1.14 |
| TCPP | 45 | 19.77 | 45 | 18.93 |
| TEP | 3.75 | 1.65 | 3.75 | 1.58 |
| Koc | 3 | 1.32 | 5 | 2.10 |
| DMDEE | 0 | 0.00 | 3 | 1.26 |
| Bismuth catalyst | 6 | 2.64 | 5 | 2.10 |
| Solstice GBA | 61 | 26.80 | 30 | 12.62 |
| Solstice LBA | 0 | 0.00 | 37 | 15.57 |
| Total | 227.7 | 100 | 237.7 | 100 |
| ISO Index[a] | 172 | | 175 | |
| Fresh sample | | | | |
| Gel time (sec) | 35 | | 35 | |
| Tack free time (sec) | 44 | | 55 | |
| Aged-2 days 50° C. | | | | |
| Gel time (sec) | 42 | | 42 | |
| Tack free time (sec) | 51 | | 78 | |
| Aged-7 days 50° C. | | | | |
| Gel time (sec) | 95 | | N.A. - foam collapse | |
| Tack free time (sec) | Not measurable | | N.A. - foam collapse | |
| CDR | 2.71 | | — | |
| TFT increase (%) | — | | — | |

[a] calculated as the ISO index which would be obtained when the complete polyol component (including Solstice GBA) would be mixed at a 1:1 volume ratio with an isocyanate component consisting of 93.81 wt. % suprasec 5025 and 6.19 wt. % Solstice GBA.

| COMPOSITION | Example 8 parts by wt. | wt. % | Example 9 parts by wt. | wt. % | Example 10 parts by wt. | wt. % |
|---|---|---|---|---|---|---|
| Polyol component | | | | | | |
| Z425 | 62.50 | 28.67 | 62.50 | 28.80 | 62.50 | 28.74 |
| PA240 | 37.50 | 17.20 | 37.50 | 17.28 | 37.50 | 17.24 |
| Struksilon 8026 | 6.25 | 2.87 | 6.25 | 2.88 | 6.25 | 2.87 |
| water | 2.50 | 1.15 | 2.50 | 1.15 | 2.50 | 1.15 |
| TCPP | 45.00 | 20.64 | 45.00 | 20.74 | 45.00 | 20.69 |
| TEP | 3.75 | 1.72 | 3.75 | 1.73 | 3.75 | 1.72 |
| DMDEE | 6.50 | 2.98 | 6.50 | 3.00 | 6.50 | 2.99 |
| DMTDLM | 4.00 | 1.83 | 0.00 | 0.00 | 0.00 | 0.00 |
| dabco T120 | 0.00 | 0.00 | 3.00 | 1.38 | 0.00 | 0.00 |
| UL-54 | 0.00 | 0.00 | 0.00 | 0.00 | 3.50 | 1.61 |
| Solstice LBA | 20.00 | 9.17 | 20.00 | 9.22 | 20.00 | 9.20 |
| Solstice GBA | 30.00 | 13.76 | 30.00 | 13.82 | 30.00 | 13.79 |
| Total | 218 | 100.00 | 217.0 | 100.00 | 217.5 | 100 |
| ISO Index | 163 | | 162 | | 162 | |
| Fresh sample | | | | | | |
| Gel time (sec) | 29 | | 24 | | 24 | |
| Tack free time (sec) | 43 | | 32 | | 35 | |
| Aged-3 days 50° C. | | | | | | |
| Gel time (sec) | 28 | | 24 | | 27 | |
| Tack free time (sec) | 36 | | 29 | | 36 | |
| CDR | 0.97 | | 1 | | 1.13 | |
| TFT increase (%) | −26% | | −9% | | 2% | |
| Aged-7 days 50° C. | | | | | | |
| Gel time (sec) | 27 | | 24 | | 30 | |
| Tack free time (sec) | 38 | | 30 | | 42 | |
| CDR | 0.93 | | 1 | | 1.25 | |
| TFT increase (%) | −12% | | −6% | | 20% | |
| Aged-2 months at room temperature (23° C. ± 2° C.) | | | | | | |
| Gel time (sec) | 27 | | 23 | | 28 | |
| Tack free time (sec) | 39 | | 29 | | 40 | |

-continued

| COMPOSITION | Example 8 parts by wt. | Example 8 wt. % | Example 9 parts by wt. | Example 9 wt. % | Example 10 parts by wt. | Example 10 wt. % |
|---|---|---|---|---|---|---|
| CDR | | 0.93 | | 0.96 | | 1.17 |
| TFT increase (%) | | −9% | | −9% | | 14% |

| COMPOSITION | Example 11 parts by wt. | Example 11 wt. % |
|---|---|---|
| Polyol component | | |
| Z425 | 62.50 | 28.74 |
| PA240 | 37.50 | 17.24 |
| Struksilon 8026 | 6.25 | 2.87 |
| water | 2.50 | 1.15 |
| TCPP | 45.00 | 20.69 |
| TEP | 3.75 | 1.72 |
| DMDEE | 6.50 | 2.99 |
| UL-54 | 3.50 | 1.61 |
| Solstice LBA | 20.00 | 9.20 |
| Solstice GBA | 30.00 | 13.79 |
| Total | 217.50 | 100.00 |
| ISO Index | 162 | |
| Fresh sample | | |
| Gel time (sec) | 27 | |
| Tack free time (sec) | 38 | |
| Aged-7 days 50° C. | | |
| Gel time (sec) | 31 | |
| Tack free time (sec) | 44 | |
| CDR | 1.15 | |
| TFT increase (%) | 16% | |
| Aged-14 days 50° C. | | |
| Gel time (sec) | 34 | |
| Tack free time (sec) | 43 | |
| CDR | 1.26 | |
| TFT increase (%) | 13% | |

| COMPOSITION | Example 12 parts by wt. | Example 12 wt. % | Example 13 parts by wt. | Example 13 wt. % | Example 14 parts by wt. | Example 14 wt. % | Example 15 parts by wt. | Example 15 wt. % |
|---|---|---|---|---|---|---|---|---|
| Polyol component | | | | | | | | |
| Z425 | 62.50 | 30.30 | 62.50 | 30.14 | 62.50 | 29.99 | 62.50 | 29.20 |
| PA240 | 37.50 | 18.18 | 37.50 | 18.09 | 37.50 | 17.99 | 37.50 | 17.52 |
| DC193 | 6.25 | 3.03 | 6.25 | 3.01 | 6.25 | 3.00 | 6.25 | 2.92 |
| water | 2.50 | 1.21 | 2.50 | 1.21 | 2.50 | 1.20 | 2.50 | 1.17 |
| TCPP | 35.00 | 16.97 | 35.00 | 16.88 | 35.00 | 16.79 | 35.00 | 16.35 |
| TEP | 3.75 | 1.82 | 3.75 | 1.81 | 3.75 | 1.80 | 3.75 | 1.75 |
| DMDEE | 6.50 | 3.15 | 5.85 | 2.82 | 5.20 | 2.50 | 4.55 | 2.13 |
| DMTDLM | 4.00 | 1.94 | 3.20 | 1.54 | 2.40 | 1.15 | 2.00 | 0.93 |
| Solstice LBA | 19.30 | 9.36 | 19.30 | 9.31 | 19.30 | 9.26 | 20.00 | 9.34 |
| Solstice GBA | 29.00 | 14.06 | 29.00 | 13.99 | 29.00 | 13.92 | 30.00 | 14.02 |
| Glycerine | 0.00 | 0.00 | 2.50 | 1.21 | 5.00 | 2.40 | 10.00 | 4.67 |
| Total | 206.30 | 100.00 | 207.35 | 100.00 | 208.40 | 100.00 | 214.05 | 100.00 |
| ISO Index[a] | 155 | | 142 | | 132 | | 117 | |
| Fresh sample | | | | | | | | |
| Gel time (sec) | 28 | | 24 | | 22 | | 17 | |
| Tack free time (sec) | 43 | | 38 | | 33 | | 26 | |
| Aged-14 days 50° C. | | | | | | | | |
| Gel time (sec) | 26 | | 25 | | 23 | | 18 | |
| Tack free time (sec) | 34 | | 32 | | 29 | | 25 | |
| CDR | 0.93 | | 1.04 | | 1.05 | | 1.06 | |
| TFT increase (%) | −20% | | −16% | | −12% | | −4% | |
| Aged-21 days 50° C. | | | | | | | | |
| Gel time (sec) | 28 | | 26 | | 25 | | 19 | |
| Tack free time (sec) | 34 | | 33 | | 33 | | 23 | |
| CDR | 1 | | 1.08 | | 1.14 | | 1.12 | |
| TFT increase (%) | −21% | | −13% | | 0% | | −12% | |

|  | Example 16 | | Example 17 | |
|---|---|---|---|---|
| COMPOSITION | parts by wt. | wt. % | parts by wt. | wt. % |
| Polyol component | | | | |
| Z425 | 62.50 | 28.67 | 62.50 | 28.67 |
| PA240 | 37.50 | 17.20 | 37.50 | 17.20 |
| DC193 | 6.25 | 2.87 | 6.25 | 2.87 |
| water | 2.50 | 1.15 | 2.50 | 1.15 |
| TCPP | 45.00 | 20.64 | 45.00 | 20.64 |
| TEP | 3.75 | 1.72 | 3.75 | 1.72 |
| DMDEE | 6.50 | 2.98 | 0.00 | 0.00 |
| DMTDLM | 4.00 | 1.83 | 4.00 | 1.83 |
| Polycat 12 | 0.00 | 0.00 | 6.50 | 2.98 |
| Solstice LBA | 20.00 | 9.17 | 20.00 | 9.17 |
| Solstice GBA | 30.00 | 13.76 | 30.00 | 13.76 |
| Total | 218.00 | 100.00 | 218.00 | 100.00 |
| ISO index | 161 | | 163 | |
| Fresh sample | | | | |
| Gel time (sec) | 29 | | 25 | |
| Tack free time (sec) | 43 | | 38 | |
| Aged-7 days 50° C. | | | | |
| Gel time (sec) | 29 | | 27 | |
| Tack free time (sec) | 43 | | 36 | |
| CDR | 1 | | 1.08 | |
| TFT increase (%) | 0% | | 5% | |
| Aged-14 days 50° C. | | | | |
| Gel time (sec) | Not determined | | 27 | |
| Tack free time (sec) | Not determined | | 36 | |
| CDR | — | | 1.08 | |
| TFT increase (%) | — | | 5% | |
| Aged-21 days 50° C. | | | | |
| Gel time (sec) | 32 | | 30 | |
| Tack free time (sec) | 44 | | 39 | |
| CDR | 1.10 | | 1.20 | |
| TFT increase (%) | 2% | | 3% | |

In the following examples 19 and 20, the TBNPA was first dissolved in part of the TCPP, such that a 50 wt. % solution of TBNPA in TCPP was obtained, and the resulting solution was used in forming the polyol component.

|  | Example 18 | | Example 19 | | Example 20 | |
|---|---|---|---|---|---|---|
| COMPOSITION | parts by wt. | wt. % | parts by wt. | wt. % | parts by wt. | wt. % |
| Polyol component | | | | | | |
| Z425 | 62.50 | 29.17 | 62.50 | 27.26 | 62.50 | 27.69 |
| PA240 | 37.50 | 17.50 | 37.50 | 16.36 | 37.50 | 16.61 |
| DC193 | 6.25 | 2.92 | 6.25 | 2.73 | 6.25 | 2.77 |
| water | 2.50 | 1.17 | 2.50 | 1.09 | 4.00 | 1.77 |
| TCPP | 30.00 | 14.00 | 30.00 | 13.09 | 30.00 | 13.29 |
| TEP | 15.00 | 7.00 | 15.00 | 6.54 | 15.00 | 6.64 |
| DMTDLM | 4.00 | 1.87 | 4.00 | 1.74 | 4.00 | 1.77 |
| Polycat 12 | 6.50 | 3.03 | 6.50 | 2.84 | 6.50 | 2.88 |
| Solstice LBA | 20.00 | 9.33 | 20.00 | 8.72 | 10.00 | 4.43 |
| Solstice GBA | 30.00 | 14.00 | 30.00 | 13.09 | 35.00 | 15.50 |
| TBNPA | 0.00 | 0.00 | 15.00 | 6.54 | 15.00 | 6.65 |
| Total | 214.25 | 100 | 229.3 | 100 | 225.75 | 100 |
| ISO index | 162 | | 160 | | 135 | |
| Fresh sample | | | | | | |
| Gel time (sec) | 23 | | 23 | | 20 | |
| Tack free time (sec) | 38 | | 34 | | 25 | |
| Aged-7 days 50° C. | | | | | | |
| Gel time (sec) | 27 | | 24 | | 23 | |
| Tack free time (sec) | 34 | | 32 | | 27 | |
| CDR | 1.17 | | 1.04 | | 1.15 | |
| TFT increase (%) | −11% | | −6% | | 8% | |
| Aged-14 days 50° C. | | | | | | |
| Gel time (sec) | 28 | | 28 | | 26 | |
| Tack free time (sec) | 37 | | 35 | | 32 | |
| CDR | 1.22 | | 1.22 | | 1.3 | |
| TFT increase (%) | −3% | | 3% | | 28% | |
| Aged-28 days 50° C. | | | | | | |
| Gel time (sec) | 34 | | 34 | | 34 | |
| Tack free time (sec) | 43 | | 42 | | 40 | |
| CDR | 1.49 | | 1.48 | | 1.7 | |
| TFT increase (%) | 13% | | 24% | | 60% | |

In the following examples 21 and 22, the nitrogen catalyst was at least partially added as its corresponding ammonium ion by mixing the amounts of water, amine and acid listed in the below table and homogenizing before addition to the rest of the polyol component. For example 21, the water, amine and succinic acid were heated to 50° C. in order to provide a homogenous solution.

In the following examples 21 and 22, the TBNPA was first dissolved in part of the TCPP, such that a 50 wt. % solution of TBNPA in TCPP was obtained, and the resulting solution was used in forming the polyol component.

In the following examples 21 and 22, the Reactint Orange X96 was first dissolved in part of the TCPP, such that a 2.44 wt. % solution of Reactint Orange X96 in TCPP was obtained, and the resulting solution was used in forming the polyol component.

In the following example 23, the nitrogen catalyst is a quaternary ammonium compound (tetramethylammonium) which was added in the form of a salt with succinate by first combining the amount listed in the below table of the commercially available catalyst Dabco TMR-7 with a small amount of water and the amount of succinic acid listed in the below table. The resulting solution was used in forming the polyol component.

|  | Example 21 | | Example 22 | | Example 23 | |
|---|---|---|---|---|---|---|
| Example COMPOSITION | parts by wt. | wt. % | parts by wt. | wt. % | parts by wt. | wt. % |
| Polyol component | | | | | | |
| Z425 | 62.50 | 27.23 | 62.50 | 27.30 | 62.50 | 28.82 |
| PA240 | 37.50 | 16.34 | 37.50 | 16.38 | 37.50 | 17.29 |
| DC193 | 6.25 | 2.72 | 6.25 | 2.73 | 6.25 | 2.88 |
| water | 3.20 | 1.39 | 3.20 | 1.40 | 2.50 | 1.15 |
| TCPP | 30.00 | 13.09 | 30.01 | 13.11 | 45.00 | 20.75 |
| TEP | 10.00 | 4.36 | 10.00 | 4.37 | 3.75 | 1.73 |
| Dabco T120 | 1.95 | 0.85 | 1.95 | 0.85 | 4.00 | 1.84 |
| Polycat 12 | 4.23 | 1.84 | 4.23 | 1.85 | 0.00 | 0.00 |

-continued

| Example COMPOSITION | Example 21 parts by wt. | wt. % | Example 22 parts by wt. | wt. % | Example 23 parts by wt. | wt. % |
|---|---|---|---|---|---|---|
| Dabco TMR-7 | 0.00 | 0.00 | 0.00 | 0.00 | 4.00 | 1.84 |
| Reactint Orange X96 | 0.30 | 0.13 | 0.30 | 0.13 | 0.00 | 0.00 |
| TBNPA | 15.00 | 6.54 | 15.00 | 6.55 | 0.00 | 0.00 |
| Glycerine | 6.00 | 2.61 | 6.00 | 2.62 | 0.00 | 0.00 |
| Solstice LBA | 10.00 | 4.36 | 10.00 | 4.37 | 20.00 | 9.22 |
| Solstice GBA | 40.00 | 17.43 | 40.00 | 17.47 | 30.00 | 13.84 |
| succinic acid | 2.55 | 1.11 | 0.00 | 0.00 | 1.34 | 0.62 |
| Formic acid | 0.00 | 0.00 | 1.99 | 0.87 | 0.00 | 0.00 |
| Total | 229.48 | 100.00 | 228.92 | 100.00 | 216.84 | 100 |
| ISO index | 119.39 | | 119.39 | | 185.01 | |
| Fresh sample | | | | | | |
| Gel time (sec) | 13 | | 21 | | 14 | |
| Tack free time (sec) | 14 | | 24 | | 17 | |
| Aged-7 days 50° C.[1] | | | | | | |
| Gel time (sec) | 14 | | 20 | | 14 | |
| Tack free time (sec) | 15 | | 25 | | 15 | |
| CDR | 1.08 | | 0.95 | | 1.00 | |
| TFT increase (%) | 7% | | 4% | | −13% | |
| Aged-14 days 50° C. | | | | | | |
| Gel time (sec) | 14 | | 22 | | Not determined | |
| Tack free time (sec) | 17 | | 24 | | Not determined | |
| CDR | 1.08 | | 1.57 | | Not determined | |
| TFT increase (%) | 21% | | 0% | | Not determined | |
| Aged-28 days 50° C.[1] | | | | | | |
| Gel time (sec) | 15 | | 21 | | 14 | |
| Tack free time (sec) | 16 | | 22 | | 15 | |
| CDR | 1.15 | | 1 | | 1.00 | |
| TFT increase (%) | 14% | | 8% | | −13% | |

[1]Example 23 was aged at 40° C.

As can be seen from the above examples, the polyol components in accordance with the invention (examples 9-23) exhibit excellent shelf-life stability, as has been shown using various concentrations of the different ingredients and using additives commonly employed to provide a commercially viable foam.

Examples 24-28

The polyol components referred to in the tables below were prepared as a kit to prepare a spray-foam. The kit consists of:
- a first pressurized aerosol can which contains an isocyanate component consisting of 90 wt. % isocyanate and 10 wt. % Solstice GBA and which is pressurized to 6 bar using compressed air; and
- a second pressurized aerosol can which contains a polyol component as described in the previous examples and which is pressurized to 6 bar using compressed air.

The kit was connected by hoses (1 for each can) to a dispensing gun. When the system is activated, both compounds are dispensed in a 1:1 volume ratio and mixed with a static mixer. The free-foamed-density of the produced foam is measured.

The free-foamed-density is determined as follows: a sample is cut out of the sprayed foam when it's fully cured (after approx. 1 h) and dimensions and mass of foam piece are measured. Density can be calculated.

Preparation of Samples

The isocyanate component is prepared by transferring an amount of isocyanate into a tin aerosol can which is then closed with a valve. This compound is pressurized with a gaseous blowing agent and compressed air to 6-7 bar.

The polyol component is prepared by adding the different ingredients (without the liquid blowing agent if present) in a disposable 250 cc coated paper ice cream cup. This mixture is homogenized with a hand-held mixer (Huvema HU 13 Laserdrill with attached 60 mm diameter propeller paint mixer) at 2500-3000 rpm until homogenous. When the blended polyol is homogeneous, an amount is transferred into a tin aerosol can. Next, the liquid blowing agent is added and the can is closed with a valve. This compound is pressurized with the gaseous blowing agent and compressed air to 6 bar by adding these through the valve.

The polyol component is combined with the isocyanate component and sprayed according to the spraying procedure.

Ageing Procedure

Samples are prepared in the same way as described above, except that the polyol component is pressurized with only gaseous blowing agent (and not compressed air). The resulting aerosol can is aged in an oven at 50° C. for a certain amount of time. After this ageing period the sample is removed from the oven and allowed to cool down to RT for 24 h before being pressurized with compressed air to 6 bar.

The aged polyol component is combined with the non-aged isocyanate component and sprayed according to the spraying procedure.

Spraying Procedure

An un-aged isocyanate component is combined with a fresh or aged polyol component by means of a dispensing unit. Before spraying both components are shaken vigorously. The gun is activated and the foam is dispensed until cans are empty.

Results:

In the following examples 24-28, the nitrogen catalyst was at least partially added as its corresponding ammonium ion by mixing the amounts of water, amine and acid listed in the below table and homogenizing before addition to the rest of the polyol component.

In the following examples 24-27, the TBNPA was first dissolved in part of the TCPP, such that a 50 wt. % solution of TBNPA in TCPP was obtained, and the resulting solution was used in forming the polyol component.

In the following examples 24-27, the Reactint Orange X96 was first dissolved in part of the TCPP, such that a 2.44 wt. % solution of Reactint Orange X96 in TCPP was obtained, and the resulting solution was used in forming the polyol component.

| COMPOSITION | Comparative example 24 parts by wt. | Comparative example 24 wt. % | Comparative example 25 parts by wt. | Comparative example 25 wt. % | Comparative example 26 parts by wt. | Comparative example 26 wt. % | Example 27 parts by wt. | Example 27 wt. % | Example 28 parts by wt. | Example 28 wt. % |
|---|---|---|---|---|---|---|---|---|---|---|
| Polyol component | | | | | | | | | | |
| Z425 | 62.50 | 27.23 | 62.50 | 27.11 | 62.50 | 27.75 | 62.50 | 27.23 | 62.5 | 28.84 |
| PA240 | 37.50 | 16.34 | 37.50 | 16.27 | 37.50 | 16.65 | 37.50 | 16.34 | 37.5 | 17.30 |
| DC193 | 6.25 | 2.72 | 6.25 | 2.71 | 6.25 | 2.78 | 6.25 | 2.72 | 0 | 0 |
| Struksilon 8026 | 0 | 0 | 0 | 0 | 0 | 0 | 0 | 0 | 6.25 | 2.88 |
| water | 3.20 | 1.39 | 3.20 | 1.39 | 3.20 | 1.42 | 3.20 | 1.39 | 3.2 | 1.48 |
| TCPP | 30.00 | 13.07 | 30.00 | 13.01 | 30.00 | 13.32 | 30.00 | 13.07 | 40 | 18.45 |
| TEP | 10.00 | 4.36 | 10.00 | 4.34 | 10.00 | 4.44 | 10.00 | 4.36 | 10 | 4.61 |
| Dabco T120 | 0.00 | 0.00 | 0.00 | 0.00 | 1.95 | 0.87 | 1.95 | 0.85 | 1.95 | 0.90 |
| Polycat 12 | 4.23 | 1.84 | 4.23 | 1.83 | 0.00 | 0.00 | 4.23 | 1.84 | 0 | 0 |
| Reactint Orange X96 | 0.31 | 0.13 | 0.31 | 0.13 | 0.31 | 0.14 | 0.31 | 0.14 | 0 | 0 |
| TBNPA | 15.00 | 6.54 | 15.00 | 6.51 | 15.00 | 6.66 | 15.00 | 6.54 | 0 | 0 |
| Glycerine | 6.00 | 2.61 | 6.00 | 2.60 | 6.00 | 2.66 | 6.00 | 2.61 | 0 | 0 |
| Dabco TMR 7 | 0 | 0 | 0 | 0 | 0 | 0 | 0 | 0 | 4 | 1.85 |
| Solstice LBA | 10.00 | 4.36 | 10.00 | 4.34 | 10.00 | 4.44 | 10.00 | 4.36 | 10 | 4.61 |
| Solstice GBA | 40.00 | 17.43 | 40.00 | 17.35 | 40.00 | 17.76 | 40.00 | 17.43 | 40 | 18.45 |
| succinic acid | 2.55 | 1.11 | 2.55 | 1.11 | 0.00 | 0.00 | 2.55 | 1.11 | 1.35 | 0.62 |
| Dioctyltindilaurate | 1.95 | 0.85 | 0.00 | 0.00 | 0.00 | 0.00 | 0.00 | 0.00 | 0 | 0 |
| Bismuth catalyst | 0.00 | 0.00 | 3.00 | 1.30 | 0.00 | 0.00 | 0.00 | 0.00 | 0 | 0 |
| Dabco 2040 | 0.00 | 0.00 | 0.00 | 0.00 | 2.50 | 1.11 | 0.00 | 0.00 | 0 | 0 |
| Total | 229.48 | 100.00 | 230.53 | 100.00 | 225.21 | 100.00 | 229.48 | 100.00 | 216.7 | 100 |
| ISO Index$^a$ | 119.38 | | 119.69 | | 118.65 | | 119.39 | | 137.97 | |
| Fresh sample | | | | | | | | | | |
| Gel time (sec) | 150 | | 81 | | 39 | | 32 | | 45 | |
| Tack free time (sec) | Not measurable | | 127 | | 52 | | 44 | | 60 | |
| Density (kg/m$^3$) | Not measurable | | 34.5 | | 29.4 | | 27.0 | | 27.0 | |
| Thermal conductivity (mW/m · K) | Not measurable | | 28.8 | | 21.4 | | 20.7 | | Not determined | |
| Aged-7 days 50° C. | | | | | | | | | | |
| Gel time (sec) | 75 | | 150 | | 75 | | 35 | | Not determined | |
| Tack free time (sec) | 130 | | 290 | | 150 | | 46 | | Not determined | |
| CDR | 0.5 | | 1.85 | | 1.92 | | 1.09 | | Not determined | |
| TFT increase (%) | — | | 128% | | 188% | | 4% | | Not determined | |
| Density (kg/m$^3$) | 31.58 | | 33.70 | | 31.67 | | 26.7 | | Not determined | |

As can be seen from the above examples, the polyol component in accordance with the invention exhibits excellent shelf-life stability, and the spray-foam prepared using the polyol component in accordance with the invention possesses and/or maintains excellent density and/or thermal conductivity properties. The maximum compressive strength of the foam of example 28 prepared using a fresh (non-aged) polyol sample was determined in accordance with EN 826 (2013) to be 148.8 kPa (average of three measurements).

Example 29

The polyol components referred to in the tables below were prepared as a kit to prepare a spray-foam. The kit and spraying procedures are as described in examples 24-28 with the difference that the canisters were pressurized to 17 bar using Nitrogen gas (instead of 6 bar using air). The test was performed at a 12 kg scale (combined weight of both components).

In the following example 29, the TBNPA was first dissolved in part of the TCPP, such that a 50 wt. % solution of TBNPA in TCPP was obtained, and the resulting solution was used in forming the polyol component.

In the following example 29, the Reactint Orange X96 was first dissolved in part of the TCPP, such that a 2.44 wt. % solution of Reactint Orange X96 in TCPP was obtained, and the resulting solution was used in forming the polyol component.

| COMPOSITION | Example 29 parts by wt. | Example 29 wt. % |
|---|---|---|
| Polyol component | | |
| Z425 | 62.50 | 27.54 |
| PA240 | 37.50 | 16.52 |
| DC193 | 6.25 | 2.75 |
| water | 3.20 | 1.41 |
| TCPP | 30 | 13.22 |
| TEP | 10.00 | 4.41 |
| Dabco T120 | 1.95 | 0.86 |
| Polycat 12 | 4.23 | 1.86 |
| Reactint Orange X96 | 0.31 | 0.14 |
| TBNPA | 15.00 | 6.61 |

-continued

| COMPOSITION | Example 29 | |
|---|---|---|
| | parts by wt. | wt. % |
| Glycerine | 6.00 | 2.64 |
| Solstice LBA | 10.00 | 4.41 |
| Solstice GBA | 40.00 | 17.63 |
| Total | 226.93 | 100.00 |
| ISO Index | 122.5 | |
| Fresh sample | | |
| Gel time (sec) | | 31 |
| Density (kg/m$^3$) | | 32.4 |
| Aged - 34 days at room temperature (23° C. ± 2° C.) | | |
| Gel time (sec) | | 35 |
| Density (kg/m$^3$) | | 32.7 |
| CDR | | 1.13 |

As can be seen from the above example 29, the polyol component in accordance with the invention exhibits excellent shelf-life stability, and the spray-foam prepared using the polyol component in accordance with the invention possesses and/or maintains excellent density properties.

The invention is further described by the following embodiments A-O

A. A polyol component suitable for producing two component polyurethane foam wherein the polyol component comprises a polyol; a gaseous hydrohaloolefin blowing agent; a nitrogen catalyst; and a tin catalyst, wherein the tin catalyst comprises a sulfur atom.

B. The polyol component according to embodiment A wherein the polyol is selected from the group consisting of a sucrose containing polyol; phenol, a phenol formaldehyde containing polyol; a glucose containing polyol; a sorbitol containing polyol; a methylglucoside containing polyol; an aromatic polyester polyol; an aliphatic polyester polyol; an aromatic polyether polyol; an aliphatic polyether polyol; a polybutadiene polyol; a polycaprolactone polyol; a polycarbonate polyol; a hydroxyl terminated polyolefin polyol; a graft polyol; glycerol; ethylene glycol; diethylene glycol; propylene glycol-containing polyol; graft copolymers of polyether polyols with a vinyl polymer; a copolymer of a polyether polyol with a polyurea; one or more of (a) condensed with one or more of (b): (a) glycerine, ethylene glycol, diethylene glycol, trimethylolpropane, pentaerythritol, soy oil, lecithin, tall oil, palm oil, castor oil; (b) ethylene oxide, propylene oxide, a mixture of ethylene oxide and propylene oxide; or combinations thereof, preferably a sucrose containing polyol.

C. The polyol component according to embodiment A or B comprising polyether and/or polyester polyol in an amount of more than 50 wt. % based on the total weight of polyol present in the polyol component, preferably more than 70 wt. %, preferably more than 85 wt. %, preferably more than 95 wt. %, preferably more than 98 wt. %, preferably more than 99 wt. %.

D. The polyol component according to any one of embodiments A-C comprising aliphatic polyether polyols, aliphatic polyester polyols, aromatic polyester polyols and combinations thereof in an amount of more than 50 wt. % based on the total weight of polyol present in the polyol component, preferably more than 70 wt. %, preferably more than 85 wt. %, preferably more than 95 wt. %, preferably more than 98 wt. %, preferably more than 99 wt. %.

E. The polyol component according to any one of embodiments A-D wherein the gaseous hydrohaloolefin blowing agent is selected from 1,3,3,3-tetrafluoropropene (HFO 1234ze); 2,3,3,3-tetrafluoroprop-1-ene (HFO 1234yf); 1,1,3,3-tetrafluoropropene; 1,2,3,3,3-pentafluoropropene (HFO 1225ye); 3,3,3-trifluoropropene; 1,1,1,3,3-pentafluoropropene (HFO 1225zc); 1,1,2,3,3-pentafluoropropene (HFO 1225yc); (Z)-1,1,1,2,3-pentafluoropropene (HFO 1225yez); or a combination thereof, preferably HFO 1234ze, preferably HFO 1234ze(E).

F. The polyol component according to any one of embodiments A-E wherein the polyol component further comprises a liquid hydrohaloolefin blowing agent, preferably HFO-1336mzz, HFO-1233zd and combinations thereof, preferably HFO-1336mzz(Z), HFO-1233zd(E) and combinations thereof.

G. The polyol component according to any one of embodiments A-F wherein the polyol component comprises halogenated non-hydrohaloolefin blowing agents in an amount of less than 10 wt. %, preferably less than 5 wt. %, preferably less than 1 wt. %, preferably 0 wt. %, preferably 0 wt. % by total weight of the polyol component.

H. The polyol component according to any one of embodiments A-G wherein the nitrogen catalyst is a sterically hindered amine catalyst or its corresponding ammonium ion, preferably a catalyst selected from the group of dicyclohexylmethylamine, ethyldiiso propylamine, dimethylcyclohexylamine, dimethylisopropylamine, methylisopropylbenzylamine, methylcyclopentylbenzylamine, isopropyl-sec-butyl-trifluoroethylamine, diethyl-(α-phenylethyl) amine, tri-n-propylamine, dicyclohexylamine, t-butylisopropylamine, di-t-butylamine, cyclohexyl-t-butylamine, di-sec-butylamine, dicyclopentylamine, di-(α-trifluoromethylethyl)amine, di-(α-phenylethyl) amine, triphenylmethylamine, 1,1-diethyl-n-propylamine, dimorpholinodiethylether, N-ethylmorpholine, N-methylmorpholine, bis(dimethylaminoethyl)ether imidizole, n-methylimidazole, 1,2-dimethylimidazole, dimorpholinodimethylether, N,N,N',N',N",N"-pentamethyldiethylenetriamine, N,N,N',N',N",N"-pentaethyldiethylenetriamine, N,N,N',N',N",N"-pentamethyldipropylenetriamine, bis(diethylaminoethyl)ether, bis(dimethylaminopropyl)ether, its corresponding ammonium ions and combinations thereof, preferably 2,2'-dimorfolinodiethylether or dicyclohexylmethylamine, its corresponding ammonium ions and combinations thereof.

I. The polyol component according to any one of embodiments A-H wherein the tin catalyst is selected from the group of tin mercaptides, preferably dioctyltin dilaurylmercaptide, dimethyltin bis(2-ethylhexyl thioglycolate), dioctyltin bis(2-ethylhexyl thioglycolate), octyltin tris(2-ethylhexyl thioglycolate), dibutyltin bis(2-ethylhexyl thioglycolate), dimethyltindiisooctyl thioglycolate, methyltintriisooctyl thioglycolate, dimethyltindilaurylmercaptide, dibutyltindilaurylmercaptide, and combinations thereof, preferably dibutyltindilaurylmercaptide, dimethyltindilaurylmercaptide, dioctyl dilaurylmercaptide and combinations thereof.

J. The polyol component according to any one of embodiments A-I comprising
  20 wt. % to 95 wt. %, preferably from 30 wt. % to 60 wt. %, and more preferably from 40 wt. % to 50 wt. % polyol by total weight of the polyol component;
  5-50 wt. %, preferably 10-30 wt. %, preferably 15-25 wt. % gaseous hydrohaloolefin blowing agent by total weight of the polyol component;

0.1-10 wt. %, preferably 0.5-7 wt. %, preferably 1-5 wt. % nitrogen catalyst by total weight of the polyol component; and tin catalyst in an amount of 0.001-10 wt. %, preferably of 0.005-5 wt. %, more preferably 0.01-2 wt. % of tin by total weight of the polyol component.

K. A two-component polyurethane foam-forming kit wherein the kit comprises an isocyanate component comprising a suitable isocyanate and an optional blowing agent; and a polyol component as defined in any one of embodiments A-J.

L. The kit according to embodiment K wherein the isocyanate is selected from the group of aromatic diisocyanates, aromatic triisocyanates, aromatic tetraisocyanates, arylalkyl polyisocyanates, aliphatic polyisocyanates, polymethylene polyphenylisocyanates, alkylene diisocyanates, aromatic polyisocyanates, and combinations thereof.

M. A polyurethane foam blown using a polyol component as defined in any one of embodiments A-J.

N. The polyurethane foam according to embodiment M comprising a gaseous hydrohaloolefin in the cells of the foam wherein the polyurethane foam has a free-rise core density of less than 35 kg/m$^3$, less than 34 kg/m$^3$, less than 32 kg/m$^3$, less than 31 kg/m$^3$, less than 30 kg/m$^3$, less than 29 kg/m$^3$, less than 28 kg/m$^3$ with the free-rise core density measured according to EN 1602.

O. A process of forming a polyurethane foam comprising:
providing an isocyanate component comprising a suitable isocyanate and an optional blowing agent;
providing a polyol component as defined in any one of embodiments A-J; and
mixing said isocyanate component and said polyol side component to form the polyurethane foam.

The invention claimed is:

1. A polyol component suitable for producing two component polyurethane foam wherein the polyol component comprises a polyol; a gaseous hydrohaloolefin blowing agent; a nitrogen catalyst; and a tin catalyst, wherein the tin catalyst comprises a sulfur atom, wherein the gaseous hydrohaloolefin blowing agent is selected from 1,3,3,3-tetrafluoropropene (HFO 1234ze); 2,3,3,3-tetrafluoroprop-1-ene (HFO 1234yf); 1,2,3,3,3-pentafluoropropene (HFO 1225ye); 1,1,3,3,3-pentafluoropropene (HFO 1225zc); 1,1,2,3,3-pentafluoropropene (HFO 1225yc); or a combination thereof wherein the polyol component exhibits a catalytic decay ratio (CDR) after 7 days of aging at 50° C. of less than 2 and/or exhibits an increase in tack free time after 7 days of aging at 50° C. of less than 50%.

2. The polyol component according to claim 1, wherein the polyol is selected from the group consisting of a sucrose containing polyol; phenol, a phenol formaldehyde containing polyol; a glucose containing polyol; a sorbitol containing polyol; a methylglucoside containing polyol; an aromatic polyester polyol; an aliphatic polyester polyol; an aromatic polyether polyol; an aliphatic polyether polyol; a polybutadiene polyol; a polycaprolactone polyol; a polycarbonate polyol; a hydroxyl terminated polyolefin polyol; a graft polyol; glycerol; ethylene glycol; diethylene glycol; propylene glycol-containing polyol; graft copolymers of polyether polyols with a vinyl polymer; a copolymer of a polyether polyol with a polyurea; one or more of (a) condensed with one or more of (b): (a) glycerine, ethylene glycol, diethylene glycol, trimethylolpropane, pentaerythritol, soy oil, lecithin, tall oil, palm oil, castor oil; (b) ethylene oxide, propylene oxide, a mixture of ethylene oxide and propylene oxide; or combinations thereof.

3. The polyol component according to claim 1, further comprising polyether and/or polyester polyol in an amount of more than 50 wt. % based on the total weight of polyol present in the polyol component.

4. The polyol component according to claim 1, further comprising aliphatic polyether polyols, aliphatic polyester polyols, aromatic polyester polyols and combinations thereof in an amount of more than 50 wt. % based on the total weight of polyol present in the polyol component.

5. The polyol component according to claim 1, wherein the gaseous hydrohaloolefin blowing agent is FIFO 1234ze (E).

6. The polyol component according to claim 1, wherein the polyol component further comprises a liquid hydrohaloolefin blowing agent having a boiling point of more than 18° C. at 1 atm.

7. The polyol component according to claim 1, wherein the polyol component comprises halogenated non-hydrohaloolefin blowing agents in an amount of less than 10 wt. % by total weight of the polyol component.

8. The polyol component according to claim 1, wherein the nitrogen catalyst is a sterically hindered amine catalyst or its corresponding ammonium ion.

9. The polyol component according to claim 1, wherein the nitrogen catalyst comprises a quaternary ammonium compound of the formula $(NR^1R^2R^3R^4)^+$ wherein $R^1$, $R^2$, $R^3$ and $R^4$ are each independently selected from the group consisting of alkyls and alkenyls.

10. The polyol component according to claim 1, wherein the nitrogen catalyst comprises tetramethylammonium.

11. The polyol component according to claim 1, wherein the tin catalyst is selected from the group of tin mercaptides.

12. The polyol component according to claim 1, further comprising
20 wt. % to 95 wt. % polyol by total weight of the polyol component;
5-50 wt. % gaseous hydrohaloolefin blowing agent by total weight of the polyol component;
0.1-10 wt. % nitrogen catalyst by total weight of the polyol component; and
tin catalyst in an amount of 0.001-10 wt. % of tin by total weight of the polyol component.

13. A process of forming a foam comprising:
providing an isocyanate component comprising a suitable isocyanate and an optional blowing agent;
providing a polyol component according to claim 1; and
mixing said isocyanate component and said polyol side component to form the foam.

14. The polyol component according to claim 1, wherein the polyol component exhibits a catalytic decay ratio (CDR) after 28 days of aging at 50° C. of less than 2.

15. The polyol component according to claim 1, wherein the polyol component exhibits an increase in tack free time after 28 days of aging at 50° C. of less than 50%.

* * * * *